United States Patent
Markham

(10) Patent No.: US 10,124,750 B2
(45) Date of Patent: Nov. 13, 2018

(54) VEHICLE SECURITY MODULE SYSTEM

(71) Applicant: Honeywell International Inc., Morris Plains, NJ (US)

(72) Inventor: Thomas R. Markham, Fridley, MN (US)

(73) Assignee: Honeywell International Inc., Morris Plains, NJ (US)

( * ) Notice: Subject to any disclaimer, the term of this patent is extended or adjusted under 35 U.S.C. 154(b) by 235 days.

(21) Appl. No.: 15/138,987

(22) Filed: Apr. 26, 2016

(65) Prior Publication Data

US 2017/0305368 A1     Oct. 26, 2017

(51) Int. Cl.
*G06F 7/04* (2006.01)
*B60R 16/023* (2006.01)
(Continued)

(52) U.S. Cl.
CPC ........ *B60R 16/0231* (2013.01); *G07C 5/0808* (2013.01); *H04L 9/3213* (2013.01);
(Continued)

(58) Field of Classification Search
CPC . H04L 9/3263; H04L 63/102; H04L 63/0263; H04L 67/12; H04L 9/3247;
(Continued)

(56) References Cited

U.S. PATENT DOCUMENTS 3,744,461 A   7/1973 Davis
4,005,578 A   2/1977 McInerney
(Continued)

FOREIGN PATENT DOCUMENTS

CN   102063561 A   5/2011
CN   102331350 A   1/2012
(Continued)

OTHER PUBLICATIONS

The Extended European Search Report for EP Application No. 17151521.6, dated Oct. 23, 2017.
(Continued)

*Primary Examiner* — Mohammad W Reza
(74) *Attorney, Agent, or Firm* — Seager Tutte & Wickhem LLP

(57) ABSTRACT

A vehicle security system having controller area network buses, electronic control units connected to the controller area network buses, a vehicle security module connected to the controller area network buses, and an on board diagnostics connector connected to the vehicle security module. The vehicle security module may according to a policy discriminate between authorized and unauthorized signals that are input to the on board diagnostics connector. Authorized signals may be forwarded by the vehicle security module to the controller area network busses. Authorized signals may affect operation of one or more of the components of the vehicle via the electronic control units. Authorized signals may change the policy used by the vehicle security module. Unauthorized signals may be refused entry to the controller area network busses. The on board diagnostics connector may receive the signals from diagnostic instrumentation, control instrumentation, tracking instrumentation, a dongle, and so forth.

19 Claims, 18 Drawing Sheets

(51) Int. Cl.
*G07C 5/08* (2006.01)
*H04L 9/32* (2006.01)
*H04L 12/40* (2006.01)
*H04L 29/06* (2006.01)
*H04W 12/08* (2009.01)
*H04L 29/08* (2006.01)
*H04W 4/40* (2018.01)

(52) U.S. Cl.
CPC .......... *H04L 9/3228* (2013.01); *H04L 9/3247* (2013.01); *H04L 9/3263* (2013.01); *H04L 12/40* (2013.01); *H04L 63/0263* (2013.01); *H04L 63/102* (2013.01); *H04L 67/12* (2013.01); *H04W 4/40* (2018.02); *H04W 12/08* (2013.01)

(58) Field of Classification Search
CPC ..... H04L 9/3228; H04L 9/3213; H04L 12/40; H04W 12/08
USPC .......................................................... 726/2
See application file for complete search history.

(56) References Cited

U.S. PATENT DOCUMENTS

| | | |
|---|---|---|
| 4,055,158 A | 10/1977 | Marsee |
| 4,206,606 A | 6/1980 | Yamada |
| 4,252,098 A | 2/1981 | Tomczak et al. |
| 4,359,991 A | 11/1982 | Stumpp et al. |
| 4,383,441 A | 5/1983 | Willis et al. |
| 4,426,982 A | 1/1984 | Lehner et al. |
| 4,438,497 A | 3/1984 | Willis et al. |
| 4,440,140 A | 4/1984 | Kawagoe et al. |
| 4,456,883 A | 6/1984 | Bullis et al. |
| 4,485,794 A | 12/1984 | Kimberley et al. |
| 4,601,270 A | 7/1986 | Kimberley et al. |
| 4,616,308 A | 10/1986 | Morshedi et al. |
| 4,653,449 A | 3/1987 | Kamel et al. |
| 4,671,235 A | 6/1987 | Hosaka |
| 4,735,181 A | 4/1988 | Kaneko et al. |
| 4,947,334 A | 8/1990 | Massey et al. |
| 4,962,570 A | 10/1990 | Hosaka et al. |
| 5,044,337 A | 9/1991 | Williams |
| 5,076,237 A | 12/1991 | Hartman et al. |
| 5,089,236 A | 2/1992 | Clerc |
| 5,094,213 A | 3/1992 | Dudek et al. |
| 5,095,874 A | 3/1992 | Schnaibel et al. |
| 5,108,716 A | 4/1992 | Nishizawa et al. |
| 5,123,397 A | 6/1992 | Richeson |
| 5,150,289 A | 9/1992 | Badavas |
| 5,186,081 A | 2/1993 | Richardson et al. |
| 5,233,829 A | 8/1993 | Komatsu |
| 5,270,935 A | 12/1993 | Dudek et al. |
| 5,273,019 A | 12/1993 | Matthews et al. |
| 5,282,449 A | 2/1994 | Takahashi et al. |
| 5,293,553 A | 3/1994 | Dudek et al. |
| 5,349,816 A | 9/1994 | Sanbayashi et al. |
| 5,365,734 A | 11/1994 | Takeshima |
| 5,394,322 A | 2/1995 | Hansen |
| 5,394,331 A | 2/1995 | Dudek et al. |
| 5,398,502 A | 3/1995 | Watanabe |
| 5,408,406 A | 4/1995 | Mathur et al. |
| 5,431,139 A | 7/1995 | Grutter et al. |
| 5,452,576 A | 9/1995 | Hamburg et al. |
| 5,477,840 A | 12/1995 | Neumann |
| 5,560,208 A | 10/1996 | Halimi et al. |
| 5,570,574 A | 11/1996 | Yamashita et al. |
| 5,598,825 A | 2/1997 | Neumann |
| 5,609,139 A | 3/1997 | Ueda et al. |
| 5,611,198 A | 3/1997 | Lane et al. |
| 5,682,317 A | 10/1997 | Keeler et al. |
| 5,690,086 A | 11/1997 | Kawano et al. |
| 5,692,478 A | 12/1997 | Nogi et al. |
| 5,697,339 A | 12/1997 | Esposito |
| 5,704,011 A | 12/1997 | Hansen et al. |
| 5,740,033 A | 4/1998 | Wassick et al. |
| 5,746,183 A | 5/1998 | Parke et al. |
| 5,765,533 A | 6/1998 | Nakajima |
| 5,771,867 A | 6/1998 | Amstutz et al. |
| 5,785,030 A | 7/1998 | Paas |
| 5,788,004 A | 8/1998 | Friedmann et al. |
| 5,842,340 A | 12/1998 | Bush et al. |
| 5,846,157 A | 12/1998 | Reinke et al. |
| 5,893,092 A | 4/1999 | Driscoll |
| 5,917,405 A | 6/1999 | Joao |
| 5,924,280 A | 7/1999 | Tarabulski |
| 5,942,195 A | 8/1999 | Lecea et al. |
| 5,964,199 A | 10/1999 | Atago et al. |
| 5,970,075 A | 10/1999 | Wasada |
| 5,974,788 A | 11/1999 | Hepburn et al. |
| 5,995,895 A | 11/1999 | Watt et al. |
| 6,029,626 A | 2/2000 | Bruestle |
| 6,035,640 A | 3/2000 | Kolmanovsky et al. |
| 6,048,620 A | 4/2000 | Zhong |
| 6,048,628 A | 4/2000 | Hilman et al. |
| 6,055,810 A | 5/2000 | Borland et al. |
| 6,056,781 A | 5/2000 | Wassick et al. |
| 6,058,700 A | 5/2000 | Yamashita et al. |
| 6,067,800 A | 5/2000 | Kolmanovsky et al. |
| 6,076,353 A | 6/2000 | Freudenberg et al. |
| 6,105,365 A | 8/2000 | Deeba et al. |
| 6,122,555 A | 9/2000 | Lu |
| 6,134,883 A | 10/2000 | Kato et al. |
| 6,153,159 A | 11/2000 | Engeler et al. |
| 6,161,528 A | 12/2000 | Akao et al. |
| 6,170,259 B1 | 1/2001 | Boegner et al. |
| 6,171,556 B1 | 1/2001 | Burk et al. |
| 6,178,743 B1 | 1/2001 | Hirota et al. |
| 6,178,749 B1 | 1/2001 | Kolmanovsky et al. |
| 6,208,914 B1 | 3/2001 | Ward et al. |
| 6,216,083 B1 | 4/2001 | Ulyanov et al. |
| 6,233,922 B1 | 5/2001 | Maloney |
| 6,236,956 B1 | 5/2001 | Mantooth et al. |
| 6,237,330 B1 | 5/2001 | Takahashi et al. |
| 6,242,873 B1 | 6/2001 | Drozdz et al. |
| 6,263,672 B1 | 7/2001 | Roby et al. |
| 6,273,060 B1 | 8/2001 | Cullen |
| 6,279,551 B1 | 8/2001 | Iwano et al. |
| 6,312,538 B1 | 11/2001 | Latypov et al. |
| 6,314,351 B1 | 11/2001 | Chutorash |
| 6,314,662 B1 | 11/2001 | Ellis, III |
| 6,314,724 B1 | 11/2001 | Kakuyama et al. |
| 6,321,538 B2 | 11/2001 | Hasler et al. |
| 6,327,361 B1 | 12/2001 | Harshavardhana et al. |
| 6,338,245 B1 | 1/2002 | Shimoda et al. |
| 6,341,487 B1 | 1/2002 | Takahashi et al. |
| 6,347,619 B1 | 2/2002 | Whiting et al. |
| 6,360,159 B1 | 3/2002 | Miller et al. |
| 6,360,541 B2 | 3/2002 | Waszkiewicz et al. |
| 6,360,732 B1 | 3/2002 | Bailey et al. |
| 6,363,715 B1 | 4/2002 | Bidner et al. |
| 6,363,907 B1 | 4/2002 | Arai et al. |
| 6,379,281 B1 | 4/2002 | Collins et al. |
| 6,389,203 B1 | 5/2002 | Jordan et al. |
| 6,425,371 B2 | 7/2002 | Majima |
| 6,427,436 B1 | 8/2002 | Allansson et al. |
| 6,431,160 B1 | 8/2002 | Sugiyama et al. |
| 6,445,963 B1 | 9/2002 | Blevins et al. |
| 6,446,430 B1 | 9/2002 | Roth et al. |
| 6,453,308 B1 | 9/2002 | Zhao et al. |
| 6,463,733 B1 | 10/2002 | Asik et al. |
| 6,463,734 B1 | 10/2002 | Tamura et al. |
| 6,466,893 B1 | 10/2002 | Latwesen et al. |
| 6,470,682 B2 | 10/2002 | Gray, Jr. |
| 6,470,862 B2 | 10/2002 | Isobe et al. |
| 6,470,886 B2 | 10/2002 | Jestrabek-Hart |
| 6,481,139 B2 | 11/2002 | Weldle |
| 6,494,038 B2 | 12/2002 | Kobayashi et al. |
| 6,502,391 B1 | 1/2003 | Hirota et al. |
| 6,505,465 B2 | 1/2003 | Kanazawa et al. |
| 6,510,351 B1 | 1/2003 | Blevins et al. |
| 6,512,974 B2 | 1/2003 | Houston et al. |
| 6,513,495 B1 | 2/2003 | Franke et al. |

(56) References Cited

U.S. PATENT DOCUMENTS

| | | |
|---|---|---|
| 6,532,433 B2 | 3/2003 | Bharadwaj et al. |
| 6,542,076 B1 | 4/2003 | Joao |
| 6,546,329 B2 | 4/2003 | Bellinger |
| 6,549,130 B1 | 4/2003 | Joao |
| 6,550,307 B1 | 4/2003 | Zhang et al. |
| 6,553,754 B2 | 4/2003 | Meyer et al. |
| 6,560,528 B1 | 5/2003 | Gitlin et al. |
| 6,560,960 B2 | 5/2003 | Nishimura et al. |
| 6,571,191 B1 | 5/2003 | York et al. |
| 6,579,206 B2 | 6/2003 | Liu et al. |
| 6,591,605 B2 | 7/2003 | Lewis |
| 6,594,990 B2 | 7/2003 | Kuenstler et al. |
| 6,601,387 B2 | 8/2003 | Zurawski et al. |
| 6,612,293 B2 | 9/2003 | Schweinzer et al. |
| 6,615,584 B2 | 9/2003 | Ostertag |
| 6,625,978 B1 | 9/2003 | Eriksson et al. |
| 6,629,408 B2 | 10/2003 | Murakami et al. |
| 6,637,382 B1 | 10/2003 | Brehob et al. |
| 6,644,017 B2 | 11/2003 | Takahashi et al. |
| 6,647,710 B2 | 11/2003 | Nishiyama et al. |
| 6,647,971 B2 | 11/2003 | Vaughan et al. |
| 6,651,614 B2 | 11/2003 | Flamig-Vetter et al. |
| 6,662,058 B1 | 12/2003 | Sanchez |
| 6,666,198 B2 | 12/2003 | Mitsutani |
| 6,666,410 B2 | 12/2003 | Boelitz et al. |
| 6,671,596 B2 | 12/2003 | Kawashima et al. |
| 6,671,603 B2 | 12/2003 | Cari et al. |
| 6,672,052 B2 | 1/2004 | Taga et al. |
| 6,672,060 B1 | 1/2004 | Buckland et al. |
| 6,679,050 B1 | 1/2004 | Takahashi et al. |
| 6,687,597 B2 | 2/2004 | Sulatisky et al. |
| 6,688,283 B2 | 2/2004 | Jaye |
| 6,694,244 B2 | 2/2004 | Meyer et al. |
| 6,694,724 B2 | 2/2004 | Tanaka et al. |
| 6,705,084 B2 | 3/2004 | Allen et al. |
| 6,718,254 B2 | 4/2004 | Hashimoto et al. |
| 6,718,753 B2 | 4/2004 | Bromberg et al. |
| 6,725,208 B1 | 4/2004 | Hartman et al. |
| 6,736,120 B2 | 5/2004 | Surnilla |
| 6,738,682 B1 | 5/2004 | Pasadyn |
| 6,739,122 B2 | 5/2004 | Kitajima et al. |
| 6,742,330 B2 | 6/2004 | Genderen |
| 6,743,352 B2 | 6/2004 | Ando et al. |
| 6,748,936 B2 | 6/2004 | Kinomura et al. |
| 6,752,131 B2 | 6/2004 | Poola et al. |
| 6,752,135 B2 | 6/2004 | McLaughlin et al. |
| 6,757,579 B1 | 6/2004 | Pasadyn |
| 6,758,037 B2 | 7/2004 | Terada et al. |
| 6,760,631 B1 | 7/2004 | Berkowitz et al. |
| 6,760,657 B2 | 7/2004 | Katoh |
| 6,760,658 B2 | 7/2004 | Yasui et al. |
| 6,770,009 B2 | 8/2004 | Badillo et al. |
| 6,772,585 B2 | 8/2004 | Iihoshi et al. |
| 6,775,623 B2 | 8/2004 | Ali et al. |
| 6,779,344 B2 | 8/2004 | Hartman et al. |
| 6,779,512 B2 | 8/2004 | Mitsutani |
| 6,788,072 B2 | 9/2004 | Nagy et al. |
| 6,789,533 B1 | 9/2004 | Hashimoto et al. |
| 6,792,927 B2 | 9/2004 | Kobayashi |
| 6,804,618 B2 | 10/2004 | Junk |
| 6,814,062 B2 | 11/2004 | Esteghlal et al. |
| 6,817,171 B2 | 11/2004 | Zhu |
| 6,823,667 B2 | 11/2004 | Braun et al. |
| 6,826,903 B2 | 12/2004 | Yahata et al. |
| 6,827,060 B2 | 12/2004 | Huh |
| 6,827,061 B2 | 12/2004 | Nytomt et al. |
| 6,827,070 B2 | 12/2004 | Fehl et al. |
| 6,834,497 B2 | 12/2004 | Miyoshi et al. |
| 6,837,042 B2 | 1/2005 | Colignon et al. |
| 6,839,637 B2 | 1/2005 | Moteki et al. |
| 6,849,030 B2 | 2/2005 | Yamamoto et al. |
| 6,857,264 B2 | 2/2005 | Ament |
| 6,873,675 B2 | 3/2005 | Kurady et al. |
| 6,874,467 B2 | 4/2005 | Hunt et al. |
| 6,879,906 B2 | 4/2005 | Makki et al. |
| 6,882,929 B2 | 4/2005 | Liang et al. |
| 6,904,751 B2 | 6/2005 | Makki et al. |
| 6,911,414 B2 | 6/2005 | Kimura et al. |
| 6,915,779 B2 | 7/2005 | Sriprakash |
| 6,920,865 B2 | 7/2005 | Lyon |
| 6,923,902 B2 | 8/2005 | Ando et al. |
| 6,925,372 B2 | 8/2005 | Yasui |
| 6,925,796 B2 | 8/2005 | Nieuwstadt et al. |
| 6,928,362 B2 | 8/2005 | Meaney |
| 6,928,817 B2 | 8/2005 | Ahmad |
| 6,931,840 B2 | 8/2005 | Strayer et al. |
| 6,934,931 B2 | 8/2005 | Plumer et al. |
| 6,941,744 B2 | 9/2005 | Tanaka |
| 6,945,033 B2 | 9/2005 | Sealy et al. |
| 6,948,310 B2 | 9/2005 | Roberts, Jr. et al. |
| 6,953,024 B2 | 10/2005 | Linna et al. |
| 6,965,826 B2 | 11/2005 | Andres et al. |
| 6,968,677 B2 | 11/2005 | Tamura |
| 6,971,258 B2 | 12/2005 | Rhodes et al. |
| 6,973,382 B2 | 12/2005 | Rodriguez et al. |
| 6,978,744 B2 | 12/2005 | Yuasa et al. |
| 6,988,017 B2 | 1/2006 | Pasadyn et al. |
| 6,990,401 B2 | 1/2006 | Neiss et al. |
| 6,996,975 B2 | 2/2006 | Radhamohan et al. |
| 7,000,379 B2 | 2/2006 | Makki et al. |
| 7,013,637 B2 | 3/2006 | Yoshida |
| 7,016,779 B2 | 3/2006 | Bowyer |
| 7,028,464 B2 | 4/2006 | Rosel et al. |
| 7,039,475 B2 | 5/2006 | Sayyarrodsari et al. |
| 7,047,938 B2 | 5/2006 | Flynn et al. |
| 7,050,863 B2 | 5/2006 | Mehta et al. |
| 7,052,434 B2 | 5/2006 | Makino et al. |
| 7,055,311 B2 | 6/2006 | Beutel et al. |
| 7,059,112 B2 | 6/2006 | Bidner et al. |
| 7,063,080 B2 | 6/2006 | Kita et al. |
| 7,067,319 B2 | 6/2006 | Wills et al. |
| 7,069,903 B2 | 7/2006 | Surnilla et al. |
| 7,082,753 B2 | 8/2006 | Della Betta et al. |
| 7,085,615 B2 | 8/2006 | Persson et al. |
| 7,106,866 B2 | 9/2006 | Astorino et al. |
| 7,107,978 B2 | 9/2006 | Itoyama |
| 7,111,450 B2 | 9/2006 | Sumilla |
| 7,111,455 B2 | 9/2006 | Okugawa et al. |
| 7,113,835 B2 | 9/2006 | Boyen et al. |
| 7,117,046 B2 | 10/2006 | Boyden et al. |
| 7,124,013 B2 | 10/2006 | Yasui |
| 7,149,590 B2 | 12/2006 | Martin et al. |
| 7,151,976 B2 | 12/2006 | Lin |
| 7,152,023 B2 | 12/2006 | Das |
| 7,155,334 B1 | 12/2006 | Stewart et al. |
| 7,164,800 B2 | 1/2007 | Sun |
| 7,165,393 B2 | 1/2007 | Betta et al. |
| 7,165,399 B2 | 1/2007 | Stewart |
| 7,168,239 B2 | 1/2007 | Ingram et al. |
| 7,182,075 B2 | 2/2007 | Shahed et al. |
| 7,184,845 B2 | 2/2007 | Sayyarrodsari et al. |
| 7,184,992 B1 | 2/2007 | Polyak et al. |
| 7,188,637 B2 | 3/2007 | Dreyer et al. |
| 7,194,987 B2 | 3/2007 | Mogi |
| 7,197,485 B2 | 3/2007 | Fuller |
| 7,200,988 B2 | 4/2007 | Yamashita |
| 7,204,079 B2 | 4/2007 | Audoin |
| 7,212,908 B2 | 5/2007 | Li et al. |
| 7,275,374 B2 | 10/2007 | Stewart et al. |
| 7,275,415 B2 | 10/2007 | Rhodes et al. |
| 7,277,010 B2 | 10/2007 | Joao |
| 7,281,368 B2 | 10/2007 | Miyake et al. |
| 7,292,926 B2 | 11/2007 | Schmidt et al. |
| 7,302,937 B2 | 12/2007 | Ma et al. |
| 7,321,834 B2 | 1/2008 | Chu et al. |
| 7,323,036 B2 | 1/2008 | Boyden et al. |
| 7,328,577 B2 | 2/2008 | Stewart et al. |
| 7,337,022 B2 | 2/2008 | Wojsznis et al. |
| 7,349,776 B2 | 3/2008 | Spillane et al. |
| 7,383,118 B2 | 3/2008 | Imai et al. |
| 7,357,125 B2 | 4/2008 | Kolavennu |
| 7,375,374 B2 | 5/2008 | Chen et al. |
| 7,376,471 B2 | 5/2008 | Das et al. |
| 7,380,547 B1 | 6/2008 | Ruiz |

(56) References Cited

U.S. PATENT DOCUMENTS

| | | |
|---|---|---|
| 7,389,773 B2 | 6/2008 | Stewart et al. |
| 7,392,129 B2 | 6/2008 | Hill et al. |
| 7,397,363 B2 | 7/2008 | Joao |
| 7,398,082 B2 | 7/2008 | Schwinke et al. |
| 7,398,149 B2 | 7/2008 | Ueno et al. |
| 7,400,933 B2 | 7/2008 | Rawlings et al. |
| 7,400,967 B2 | 7/2008 | Ueno et al. |
| 7,413,583 B2 | 8/2008 | Langer et al. |
| 7,415,389 B2 | 8/2008 | Stewart et al. |
| 7,418,372 B2 | 8/2008 | Nishira et al. |
| 7,430,854 B2 | 10/2008 | Yasui et al. |
| 7,433,743 B2 | 10/2008 | Pistikopoulos et al. |
| 7,444,191 B2 | 10/2008 | Caldwell et al. |
| 7,444,193 B2 | 10/2008 | Cutler |
| 7,447,554 B2 | 11/2008 | Cutler |
| 7,467,614 B2 | 12/2008 | Stewart et al. |
| 7,469,177 B2 | 12/2008 | Samad et al. |
| 7,474,953 B2 | 1/2009 | Hulser et al. |
| 7,493,236 B1 | 2/2009 | Mock et al. |
| 7,505,879 B2 | 3/2009 | Tomoyasu et al. |
| 7,505,882 B2 | 3/2009 | Jenny et al. |
| 7,515,975 B2 | 4/2009 | Stewart |
| 7,522,963 B2 | 4/2009 | Boyden et al. |
| 7,536,232 B2 | 5/2009 | Boyden et al. |
| 7,577,483 B2 | 8/2009 | Fan et al. |
| 7,587,253 B2 | 9/2009 | Rawlings et al. |
| 7,591,135 B2 | 9/2009 | Stewart |
| 7,599,749 B2 | 10/2009 | Sayyarrodsari et al. |
| 7,599,750 B2 | 10/2009 | Piche |
| 7,603,185 B2 | 10/2009 | Stewart et al. |
| 7,603,226 B2 | 10/2009 | Henein |
| 7,627,843 B2 | 12/2009 | Dozorets et al. |
| 7,630,868 B2 | 12/2009 | Turner et al. |
| 7,634,323 B2 | 12/2009 | Vermillion et al. |
| 7,634,417 B2 | 12/2009 | Boyden et al. |
| 7,650,780 B2 | 1/2010 | Hall |
| 7,668,704 B2 | 2/2010 | Perchanok et al. |
| 7,676,318 B2 | 3/2010 | Allain |
| 7,698,004 B2 | 4/2010 | Boyden et al. |
| 7,702,519 B2 | 4/2010 | Boyden et al. |
| 7,712,139 B2 | 5/2010 | Westendorf et al. |
| 7,721,030 B2 | 5/2010 | Fuehrer et al. |
| 7,725,199 B2 | 5/2010 | Brackney et al. |
| 7,734,291 B2 | 6/2010 | Mazzara, Jr. |
| 7,738,975 B2 | 6/2010 | Denison et al. |
| 7,743,606 B2 | 6/2010 | Havelena et al. |
| 7,748,217 B2 | 7/2010 | Muller |
| 7,752,840 B2 | 7/2010 | Stewart |
| 7,765,792 B2 | 8/2010 | Rhodes et al. |
| 7,779,680 B2 | 8/2010 | Sasaki et al. |
| 7,793,489 B2 | 9/2010 | Wang et al. |
| 7,798,938 B2 | 9/2010 | Matsubara et al. |
| 7,808,371 B2 | 10/2010 | Blanchet et al. |
| 7,813,884 B2 | 10/2010 | Chu et al. |
| 7,826,909 B2 | 11/2010 | Attarwala |
| 7,831,318 B2 | 11/2010 | Bartee et al. |
| 7,840,287 B2 | 11/2010 | Wojsznis et al. |
| 7,844,351 B2 | 11/2010 | Piche |
| 7,844,352 B2 | 11/2010 | Vouzis et al. |
| 7,846,299 B2 | 12/2010 | Backstrom et al. |
| 7,850,104 B2 | 12/2010 | Havlena et al. |
| 7,856,966 B2 | 12/2010 | Saitoh |
| 7,860,586 B2 | 12/2010 | Boyden et al. |
| 7,861,518 B2 | 1/2011 | Federle |
| 7,862,771 B2 | 1/2011 | Boyden et al. |
| 7,877,239 B2 | 1/2011 | Grichnik et al. |
| 7,878,178 B2 | 2/2011 | Stewart et al. |
| 7,891,669 B2 | 2/2011 | Araujo et al. |
| 7,904,280 B2 | 3/2011 | Wood |
| 7,905,103 B2 | 3/2011 | Larsen et al. |
| 7,907,769 B2 | 3/2011 | Sammak et al. |
| 7,925,399 B2 | 4/2011 | Comeau |
| 7,930,044 B2 | 4/2011 | Attarwala |
| 7,933,849 B2 | 4/2011 | Bartee et al. |
| 7,958,730 B2 | 6/2011 | Stewart et al. |
| 7,970,482 B2 | 6/2011 | Srinivasan et al. |
| 7,987,145 B2 | 7/2011 | Baramov |
| 7,996,140 B2 | 8/2011 | Stewart et al. |
| 8,001,767 B2 | 8/2011 | Kakuya et al. |
| 8,019,911 B2 | 9/2011 | Dressler et al. |
| 8,025,167 B2 | 9/2011 | Schneider et al. |
| 8,032,235 B2 | 10/2011 | Sayyar-Rodsari |
| 8,046,089 B2 | 10/2011 | Renfro et al. |
| 8,046,090 B2 | 10/2011 | MacArthur et al. |
| 8,060,290 B2 | 11/2011 | Stewart et al. |
| 8,078,291 B2 | 12/2011 | Pekar et al. |
| 8,108,790 B2 | 1/2012 | Morrison, Jr. et al. |
| 8,109,255 B2 | 2/2012 | Stewart et al. |
| 8,121,818 B2 | 2/2012 | Gorinevsky |
| 8,145,329 B2 | 3/2012 | Pekar et al. |
| 8,146,850 B2 | 4/2012 | Havlena et al. |
| 8,157,035 B2 | 4/2012 | Whitney et al. |
| 8,185,217 B2 | 5/2012 | Thiele |
| 8,197,753 B2 | 6/2012 | Boyden et al. |
| 8,200,346 B2 | 6/2012 | Thiele |
| 8,209,963 B2 | 7/2012 | Kesse et al. |
| 8,229,163 B2 | 7/2012 | Coleman et al. |
| 8,245,501 B2 | 8/2012 | He et al. |
| 8,246,508 B2 | 8/2012 | Matsubara et al. |
| 8,265,854 B2 | 9/2012 | Stewart et al. |
| 8,281,572 B2 | 10/2012 | Chi et al. |
| 8,295,951 B2 | 10/2012 | Crisalle et al. |
| 8,311,653 B2 | 11/2012 | Zhan et al. |
| 8,312,860 B2 | 11/2012 | Yun et al. |
| 8,316,235 B2 | 11/2012 | Boehl et al. |
| 8,360,040 B2 | 1/2013 | Stewart et al. |
| 8,370,052 B2 | 2/2013 | Lin et al. |
| 8,379,267 B2 | 2/2013 | Mestha et al. |
| 8,396,644 B2 | 3/2013 | Kabashima et al. |
| 8,402,268 B2 | 3/2013 | Dierickx |
| 8,418,441 B2 | 4/2013 | He et al. |
| 8,453,431 B2 | 6/2013 | Wang et al. |
| 8,473,079 B2 | 6/2013 | Havlena |
| 8,478,506 B2 | 7/2013 | Grichnik et al. |
| RE44,452 E | 8/2013 | Stewart et al. |
| 8,504,175 B2 | 8/2013 | Pekar et al. |
| 8,505,278 B2 | 8/2013 | Farrell et al. |
| 8,543,170 B2 | 9/2013 | Mazzara, Jr. et al. |
| 8,555,613 B2 | 10/2013 | Wang et al. |
| 8,571,689 B2 | 10/2013 | Macharia et al. |
| 8,596,045 B2 | 12/2013 | Tuomivaara et al. |
| 8,620,461 B2 | 12/2013 | Kihas |
| 8,634,940 B2 | 1/2014 | Macharia et al. |
| 8,639,925 B2 | 1/2014 | Schuetze |
| 8,649,884 B2 | 2/2014 | MacArthur et al. |
| 8,649,961 B2 | 2/2014 | Hawkins et al. |
| 8,667,288 B2 | 3/2014 | Yavuz |
| 8,694,197 B2 | 4/2014 | Rajagopalan et al. |
| 8,700,291 B2 | 4/2014 | Herrmann |
| 8,751,241 B2 | 6/2014 | Oesterling et al. |
| 8,762,026 B2 | 6/2014 | Wolfe et al. |
| 8,763,377 B2 | 7/2014 | Yacoub |
| 8,768,996 B2 | 7/2014 | Shokrollahi et al. |
| 8,813,690 B2 | 8/2014 | Kumar et al. |
| 8,825,243 B2 | 9/2014 | Yang et al. |
| 8,839,967 B2 | 9/2014 | Schneider et al. |
| 8,867,746 B2 | 10/2014 | Ceskutti et al. |
| 8,892,221 B2 | 11/2014 | Kram et al. |
| 8,899,018 B2 | 12/2014 | Frazier et al. |
| 8,904,760 B2 | 12/2014 | Mital |
| 8,983,069 B2 | 3/2015 | Merchan et al. |
| 9,100,193 B2 | 8/2015 | Newsome et al. |
| 9,141,996 B2 | 9/2015 | Christensen et al. |
| 9,170,573 B2 | 10/2015 | Kihas |
| 9,175,595 B2 | 11/2015 | Ceynow et al. |
| 9,223,301 B2 | 12/2015 | Stewart et al. |
| 9,243,576 B2 | 1/2016 | Yu et al. |
| 9,253,200 B2 | 2/2016 | Schwarz et al. |
| 9,325,494 B2 | 4/2016 | Boehl |
| 9,367,701 B2 | 6/2016 | Merchan et al. |
| 9,367,968 B2 | 6/2016 | Giraud et al. |
| 9,483,881 B2 | 11/2016 | Comeau et al. |
| 9,560,071 B2 | 1/2017 | Ruvio et al. |
| 9,779,742 B2 | 10/2017 | Newsome, Jr. |

(56) References Cited

U.S. PATENT DOCUMENTS

| | | |
|---|---|---|
| 2002/0112469 A1 | 8/2002 | Kanazawa et al. |
| 2004/0006973 A1 | 1/2004 | Makki et al. |
| 2004/0086185 A1 | 5/2004 | Sun |
| 2004/0144082 A1 | 7/2004 | Mianzo et al. |
| 2004/0199481 A1 | 10/2004 | Hartman et al. |
| 2004/0226287 A1 | 11/2004 | Edgar et al. |
| 2005/0171667 A1 | 8/2005 | Morita |
| 2005/0187643 A1 | 8/2005 | Sayyar-Rodsari et al. |
| 2005/0193739 A1 | 9/2005 | Brunell et al. |
| 2005/0210868 A1 | 9/2005 | Funabashi |
| 2006/0047607 A1 | 3/2006 | Boyden et al. |
| 2006/0111881 A1 | 5/2006 | Jackson |
| 2006/0137347 A1 | 6/2006 | Stewart et al. |
| 2006/0168945 A1 | 8/2006 | Samad et al. |
| 2006/0185626 A1 | 8/2006 | Allen et al. |
| 2006/0212140 A1 | 9/2006 | Brackney |
| 2007/0144149 A1 | 6/2007 | Kolavennu et al. |
| 2007/0156259 A1 | 7/2007 | Baramov |
| 2007/0240213 A1 | 10/2007 | Karam et al. |
| 2007/0261648 A1 | 11/2007 | Reckels et al. |
| 2007/0275471 A1 | 11/2007 | Coward |
| 2008/0010973 A1 | 1/2008 | Gimbres |
| 2008/0103747 A1 | 5/2008 | Macharia et al. |
| 2008/0132178 A1 | 6/2008 | Chatterjee et al. |
| 2008/0208778 A1 | 8/2008 | Sayyar-Rodsari et al. |
| 2008/0289605 A1 | 11/2008 | Ito |
| 2009/0172416 A1 | 7/2009 | Bosch et al. |
| 2009/0312998 A1 | 12/2009 | Berckmans et al. |
| 2010/0122523 A1 | 5/2010 | Vosz |
| 2010/0126481 A1 | 5/2010 | Willi et al. |
| 2010/0300069 A1 | 12/2010 | Herrmann et al. |
| 2011/0056265 A1 | 3/2011 | Yacoub |
| 2011/0060424 A1 | 3/2011 | Havlena |
| 2011/0125295 A1 | 5/2011 | Bednasch et al. |
| 2011/0131017 A1 | 6/2011 | Cheng et al. |
| 2011/0167025 A1 | 7/2011 | Danai et al. |
| 2011/0173315 A1 | 7/2011 | Aguren |
| 2011/0264353 A1 | 10/2011 | Atkinson et al. |
| 2011/0270505 A1 | 11/2011 | Chaturvedi et al. |
| 2012/0024089 A1 | 2/2012 | Couey et al. |
| 2012/0109620 A1 | 5/2012 | Gaikwad et al. |
| 2012/0174187 A1 | 7/2012 | Argon et al. |
| 2013/0024069 A1 | 1/2013 | Wang et al. |
| 2013/0067894 A1 | 3/2013 | Stewart et al. |
| 2013/0111878 A1 | 5/2013 | Pachner et al. |
| 2013/0111905 A1 | 5/2013 | Pekar et al. |
| 2013/0131954 A1 | 5/2013 | Yu et al. |
| 2013/0131956 A1 | 5/2013 | Thibault et al. |
| 2013/0158834 A1 | 6/2013 | Wagner et al. |
| 2013/0204403 A1 | 8/2013 | Zheng et al. |
| 2013/0242706 A1 | 9/2013 | Newsome, Jr. |
| 2013/0326232 A1 | 12/2013 | Lewis et al. |
| 2013/0326630 A1 | 12/2013 | Argon |
| 2013/0338900 A1 | 12/2013 | Ardanese et al. |
| 2014/0032189 A1 | 1/2014 | Hehle et al. |
| 2014/0032800 A1 | 1/2014 | Peirce et al. |
| 2014/0034460 A1 | 2/2014 | Chou |
| 2014/0171856 A1 | 6/2014 | McLaughlin et al. |
| 2014/0258736 A1 | 9/2014 | Merchan et al. |
| 2014/0270163 A1 | 9/2014 | Merchan |
| 2014/0316683 A1 | 10/2014 | Whitney et al. |
| 2014/0318216 A1 | 10/2014 | Singh |
| 2014/0343713 A1 | 11/2014 | Ziegler et al. |
| 2014/0358254 A1 | 12/2014 | Chu et al. |
| 2015/0020152 A1 | 1/2015 | Litichever et al. |
| 2015/0121071 A1 | 4/2015 | Schwarz et al. |
| 2015/0191135 A1* | 7/2015 | Ben Noon ............ B60R 16/023 726/22 |
| 2015/0275783 A1 | 10/2015 | Wong et al. |
| 2015/0321642 A1 | 11/2015 | Schwepp et al. |
| 2015/0324576 A1 | 11/2015 | Quirant et al. |
| 2015/0334093 A1 | 11/2015 | Mueller |
| 2016/0003180 A1 | 1/2016 | McNulty et al. |
| 2016/0012653 A1 | 1/2016 | Soroko |
| 2016/0043832 A1 | 2/2016 | Ahn et al. |
| 2016/0082903 A1* | 3/2016 | Haggerty ............ B60R 16/023 701/23 |
| 2016/0108732 A1 | 4/2016 | Huang et al. |
| 2016/0127357 A1 | 5/2016 | Zibuschka et al. |
| 2016/0216699 A1 | 7/2016 | Pekar et al. |
| 2016/0239593 A1 | 8/2016 | Pekar et al. |
| 2016/0259584 A1 | 9/2016 | Schlottmann et al. |
| 2016/0330204 A1 | 11/2016 | Baur et al. |
| 2016/0344705 A1 | 11/2016 | Stumpf et al. |
| 2016/0362838 A1 | 12/2016 | Badwe et al. |
| 2016/0365977 A1 | 12/2016 | Boutros et al. |
| 2017/0031332 A1 | 2/2017 | Santin |
| 2017/0048063 A1 | 2/2017 | Mueller |
| 2017/0109521 A1* | 4/2017 | Ujiie ..................... H04L 12/40 |
| 2017/0126701 A1 | 5/2017 | Glas et al. |
| 2017/0218860 A1 | 8/2017 | Pachner et al. |
| 2017/0259761 A1* | 9/2017 | Ben Noon ............ B60R 16/023 |
| 2017/0300713 A1 | 10/2017 | Fan et al. |
| 2017/0306871 A1 | 10/2017 | Fuxman et al. |

FOREIGN PATENT DOCUMENTS

| | | |
|---|---|---|
| DE | 19628796 C1 | 10/1997 |
| DE | 10219382 A1 | 11/2002 |
| DE | 102009016509 A1 | 10/2010 |
| DE | 102011103346 A1 | 8/2012 |
| EP | 0301527 A2 | 2/1989 |
| EP | 0877309 B1 | 6/2000 |
| EP | 1134368 A2 | 9/2001 |
| EP | 1180583 A2 | 2/2002 |
| EP | 1221544 A2 | 7/2002 |
| EP | 1225490 A2 | 7/2002 |
| EP | 1245811 A2 | 10/2002 |
| EP | 1273337 A1 | 1/2003 |
| EP | 0950803 B1 | 9/2003 |
| EP | 1420153 A2 | 5/2004 |
| EP | 1447727 A2 | 8/2004 |
| EP | 1498791 A1 | 1/2005 |
| EP | 1425642 61 | 11/2005 |
| EP | 1686251 A1 | 8/2006 |
| EP | 1399784 B1 | 10/2007 |
| EP | 2107439 A1 | 10/2009 |
| EP | 2146258 A1 | 1/2010 |
| EP | 1794339 B1 | 7/2011 |
| EP | 1529941 B1 | 11/2011 |
| EP | 2543845 A1 | 1/2013 |
| EP | 2551480 A1 | 1/2013 |
| EP | 2589779 A2 | 5/2013 |
| EP | 2617975 A1 | 7/2013 |
| EP | 2267559 B1 | 1/2014 |
| EP | 2892201 A1 | 7/2015 |
| EP | 2919079 A2 | 9/2015 |
| JP | 59190433 A | 10/1984 |
| JP | 2010282618 A | 12/2010 |
| WO | 0144629 A2 | 6/2001 |
| WO | 0169056 A1 | 9/2001 |
| WO | 0232552 A1 | 4/2002 |
| WO | 02097540 A1 | 12/2002 |
| WO | 02101208 A1 | 12/2002 |
| WO | 03023538 A2 | 3/2003 |
| WO | 03048533 A1 | 6/2003 |
| WO | 03065135 A1 | 8/2003 |
| WO | 03078816 A1 | 9/2003 |
| WO | 03102394 A1 | 12/2003 |
| WO | 2004027230 A1 | 4/2004 |
| WO | 2006021437 A1 | 3/2006 |
| WO | 2007078907 A2 | 7/2007 |
| WO | 2008033800 A2 | 3/2008 |
| WO | 2008115911 A1 | 9/2008 |
| WO | 2012076838 A2 | 6/2012 |
| WO | 2013119665 A1 | 8/2013 |
| WO | 2014165439 A2 | 10/2014 |
| WO | 2015019104 A2 | 2/2015 |

(56) References Cited

FOREIGN PATENT DOCUMENTS

| WO | 2016053194 A1 | 4/2016 | |
|---|---|---|---|
| WO | WO 2016091439 A1 * | 6/2016 | B60R 25/00 |

OTHER PUBLICATIONS

The Extended European Search Report for EP Application No. 17163452.0, dated Sep. 26, 2017.
Greenberg, "Hackers Cut a Corvette's Brakes Via A Common Car Gadget," downloaded from https://www.wired.com2015/08/hackers-cut-corvettes-brakes-v . . . , 14 pages, Aug. 11, 2015, printed Dec. 11, 2017.
http://www.blackpoolcommunications.com/products/alarm-immo . . . , "OBD Security OBD Port Protection—Alarms & Immobilizers . . . ," 1 page, printed Jun. 5, 2017.
http://www.cnbc.com/2016/09/20/chinese-company-hacks-tesla-car-remotely.html, "Chinese Company Hacks Tesla Car Remotely," 3 pages, Sep. 20, 2016.
ISO, "ISO Document No. 13185-2:2015(E)," 3 pages, 2015.
"J1979 E/E Diagnostic Test Modules," Proposed Regulation, Vehicle E.E. System Diagnostic Standards Committee, 1 page, Sep. 28, 2010.
"MicroZed Zynq Evaluation and Development and System on Module, Hardware User Guide," Avnet Electronics Marketing, Version 1.6, Jan. 22, 2015.
Actron, "Elite AutoScanner Kit—Enhanced OBD I & II Scan Tool, OBD 1300," Downloaded from https://actron.com/content/elite-autoscanner-kit-enhanced-obd-i-and-obd-ii-scan-tool?utm_ . . . , 5 pages, printed Sep. 27, 2016.
Blue Streak Electronics Inc., "Ford Modules," 1 page, May 12, 2010.
Goodwin, "Researchers Hack a Corvette's Brakes Via Insurance Black Box," Downloaded from http://www.cnet.com/roadshow/news/researchers-hack-a-corvettes-brakes-via-insurance-black-box/, 2 pages, Aug. 2015.
Greenberg, "Hackers Remotely Kill a Jeep on the Highway—With Me in It," Downloaded from http://www.wired.com/2015/07/hackers-remotely-kill-jeep-highway/, 24 pages, Jul. 21, 2015.
Hammacher Schlemmer, "The Windshield Heads Up Display," Catalog, p. 47, prior to Apr. 26, 2016.
https://www.en.wikipedia.org/wiki/Public-key_cryptography, "Public-Key Cryptography," 14 pages, printed Feb. 26, 2016.
Zaman, "Lincoln Motor Company: Case study 2015 Lincoln MKC," Automotive Electronic Design Fundamentals, Chapter 6, 2015.
"Aftertreatment Modeling of RCCI Engine During Transient Operation," University of Wisconsin—Engine Research Center, 1 page, May 31, 2014.
"Chapter 14: Pollutant Formation," Fluent Manual, Release 15.0, Chapter 14, pp. 313-345, prior to Jan. 29, 2016.
"Chapter 21, Modeling Pollutant Formation," Fluent Manual, Release 12.0, Chapter 21, pp. 21-1-21-54, Jan. 30, 2009.
"Model Predictive Control Toolbox Release Notes," The Mathworks, 24 pages, Oct. 2008.
"Model Predictive Control," Wikipedia, pp. 1-5, Jan. 22, 2009. http://en.wikipedia.org/w/index.php/title=Special:Book&bookcmd=download&collecton_id=641cd1b5da77cc22&writer=rl&return_to=Model predictive control, retrieved Nov. 20, 2012.
"MPC Implementation Methods for the Optimization of the Response of Control Valves to Reduce Variability," Advanced Application Note 002, Rev. A, 10 pages, 2007.
"SCR, 400-csi Coated Catalyst," Leading NOx Control Technologies Status Summary, 1 page prior to Feb. 2, 2005.
Allanson, et al., "Optimizing the Low Temperature Performance and Regeneration Efficiency of the Continuously Regenerating Diesel Particulate Filter System" SAE Paper No. 2002-01-0428, 8 pages, Mar. 2002.
Amstuz, et al., "EGO Sensor Based Robust Output Control of EGR in Diesel Engines," IEEE TCST, vol. 3, No. 1, 12 pages, Mar. 1995.

Andersson et al., "A Predictive Real Time NOx Model for Conventional and Partially Premixed Diesel Combustion," SAE International 2006-01-3329, 10 pages, 2006.
Andersson et al., "A Real Time NOx Model for Conventional and Partially Premixed Diesel Combustion," SAE Technical Paper Series 2006-01-0195, 2006 SAE World Congress, 13 pages, Apr. 3-6, 2006.
Arregle et al., "On Board NOx Prediction in Diesel Engines: A Physical Approach," Automotive Model Predictive Control, Models Methods and Applications, Chapter 2, 14 pages, 2010.
Asprion, "Optimal Control of Diesel Engines," PHD Thesis, Diss ETH No. 21593, 436 pages, 2013.
Assanis et al., "A Predictive Ignition Delay Correlation Under Steady-State and Transient Operation of a Direct Injection Diesel Engine," ASME, Journal of Engineering for Gas Turbines and Power, vol. 125, pp. 450-457, Apr. 2003.
Axehill et al., "A Dual Gradiant Projection Quadratic Programming Algorithm Tailored for Model Predictive Control," Proceedings of the 47th IEEE Conference on Decision and Control, Cancun Mexico, pp. 3057-3064, Dec. 9-11, 2008.
Axehill et al., "A Dual Gradient Projection Quadratic Programming Algorithm Tailored for Mixed Integer Predictive Control," Technical Report from Linkopings Universitet, Report No. Li-Th-ISY-R-2833, 58 pages, Jan. 31, 2008.
Baffi et al., "Non-Linear Model Based Predictive Control Through Dynamic Non-Linear Partial Least Squares," Trans IChemE, vol. 80, Part A, pp. 75-86, Jan. 2002.
Bako et al., "A Recursive Identification Algorithm for Switched Linear/Affine Models," Nonlinear Analysis: Hybrid Systems, vol. 5, pp. 242-253, 2011.
Barba et al., "A Phenomenological Combustion Model for Heat Release Rate Prediction in High-Speed DI Diesel Engines with Common Rail Injection," SAE Technical Paper Series 2000-01-2933, International Fall Fuels and Lubricants Meeting Exposition, 15 pages, Oct. 16-19, 2000.
Bemporad et al., "Model Predictive Control Toolbox 3, User's Guide," Matlab Mathworks, 282 pages, 2008.
Bemporad et al., "The Explicit Linear Quadratic Regulator for Constrained Systems," Automatica, 38, pp. 3-20, 2002.
Bemporad, "Model Predictive Control Based on Linear Programming—The Explicit Solution," IEEE Transactions on Automatic Control, vol. 47, No. 12, pp. 1974-1984, Dec. 2002.
Bemporad, "Model Predictive Control Design: New Trends and Tools," Proceedings of the 45th IEEE Conference on Decision & Control, pp. 6678-6683, Dec. 13-15, 2006.
Bemporad, et al., "Explicit Model Predictive Control," 1 page, prior to Feb. 2, 2005.
Bertsekas, "On the Goldstein-Levitin-Polyak Gradient Projection Method," IEEE Transactions on Automatic Control, vol. AC-21, No. 2, pp. 174-184, Apr. 1976.
Bertsekas, "Projected Newton Methods for Optimization Problems with Simple Constraints," SIAM J. Control and Optimization, vol. 20, No. 2, pp. 221-246, Mar. 1982.
Blanco-Rodriguez, "Modelling and Observation of Exhaust Gas Concentrations for Diesel Engine Control," Phd Dissertation, 242 pages, Sep. 2013.
Borrelli et al., "An MPC/Hybrid System Approach to Traction Control," IEEE Transactions on Control Systems Technology, vol. 14, No. 3, pp. 541-553, May 2006.
Borrelli, "Constrained Optimal Control of Linear and Hybrid Systems," Lecture Notes in Control and Information Sciences, vol. 290, 2003.
Borrelli, "Discrete Time Constrained Optimal Control," A Dissertation Submitted to the Swiss Federal Institute of Technology (ETH) Zurich, Diss. ETH No. 14666, 232 pages, Oct. 9, 2002.
Bourn et al., "Advanced Compressor Engine Controls to Enhance Operation, Reliability and Integrity," Southwest Research Institute, DOE Award No. DE-FC26-03N141859, SwRI Project No. 03.10198, 60 pages, Mar. 2004.
Catalytica Energy Systems, "Innovative NOx Reduction Solutions for Diesel Engines," 13 pages, 3rd Quarter, 2003.

(56) References Cited

OTHER PUBLICATIONS

Charalampidis et al., "Computationally Efficient Kalman Filtering for a Class of Nonlinear Systems," IEEE Transactions on Automatic Control, vol. 56, No. 3, pp. 483-491, Mar. 2011.
Chatterjee, et al. "Catalytic Emission Control for Heavy Duty Diesel Engines," JM, 46 pages, prior to Feb. 2, 2005.
Chew, "Sensor Validation Scheme with Virtual NOx Sensing for Heavy Duty Diesel Engines," Master's Thesis, 144 pages, 2007.
European Search Report for EP Application No. 11167549.2 dated Nov. 27, 2012.
European Search Report for EP Application No. 12191156.4-1603 dated Feb. 9, 2015.
European Search Report for EP Application No. EP 10175270.7-2302419 dated Jan. 16, 2013.
European Search Report for EP Application No. EP 15152957.5-1807 dated Feb. 10, 2015.
The Extended European Search Report for EP Application No. 15155295.7-1606, dated Aug. 4, 2015.
The Extended European Search Report for EP Application No. 15179435.1, dated Apr. 1, 2016.
U.S. Appl. No. 15/005,406, filed Jan. 25, 2016.
U.S. Appl. No. 15/011,445, filed Jan. 29, 2016.
De Oliveira, "Constraint Handling and Stability Properties of Model Predictive Control," Camegie Institute of Technology, Department of Chemical Engineering, Paper 197, 64 pages, Jan. 1, 1993.
De Schutter et al., "Model Predictive Control for Max-Min-Plus-Scaling Systems," Proceedings of the 2001 American Control Conference, Arlington, VA, pp. 319-324, Jun. 2001.
Ding, "Characterising Combustion in Diesel Engines, Using Parameterised Finite Stage Cylinder Process Models," 281 pages, Dec. 21, 2011.
Docquier et al., "Combustion Control and Sensors: a Review," Progress in Energy and Combustion Science, vol. 28, pp. 107-150, 2002.
Dunbar, "Model Predictive Control: Extension to Coordinated Multi-Vehicle Formations and Real-Time Implementation," CDS Technical Report 01-016, 64 pages, Dec. 7, 2001.
Egnell, "Combustion Diagnostics by Means of Multizone Heat Release Analysis and NO Calculation," SAE Technical Paper Series 981424, International Spring Fuels and Lubricants Meeting and Exposition, 22 pages, May 4-6, 1998.
Ericson, "NOx Modelling of a Complete Diesel Engine/SCR System," Licentiate Thesis, 57 pages, 2007.
Finesso et al., "Estimation of the Engine-Out NO2/NOx Ration in a Euro VI Diesel Engine," SAE International 2013-01-0317, 15 pages, Apr. 8, 2013.
Fleming, "Overview of Automotive Sensors," IEEE Sensors Journal, vol. 1, No. 4, pp. 296-308, Dec. 2001.
Ford Motor Company, "2012 My OBD System Operation Summary for 6.7L Diesel Engines," 149 pages, Apr. 21, 2011.
Formentin et al., "NOx Estimation in Diesel Engines Via In-Cylinder Pressure Measurement," IEEE Transactions on Control Systems Technology, vol. 22, No. 1, pp. 396-403, Jan. 2014.
Galindo, "An On-Engine Method for Dynamic Characterisation of NOx Concentration Sensors," Experimental Thermal and Fluid Science, vol. 35, pp. 470-476, 2011.
Gamma Technologies, "Exhaust Aftertreatment with GT-Suite," 2 pages, Jul. 17, 2014.
GM "Advanced Diesel Technology and Emissions," powertrain technologies—engines, 2 pages, prior to Feb. 2, 2005.
Advanced Petroleum-Based Fuels-Diesel Emissions Control (APBF-DEC) Project, "Quarterly Update," No. 7, 6 pages, Fall 2002.
Guardiola et al., "A Bias Correction Method for Fast Fuel-to-Air Ratio Estimation in Diesel Engines," Proceedings of the Institution of Mechanical Engineers, Part D: Journal of Automobile Engineering, vol. 227, No. 8, pp. 1099-1111, 2013.
Guardiola et al., "A Computationally Efficient Kalman Filter Based Estimator for Updating Look-Up Tables Applied to NOx Estimation in Diesel Engines," Control Engineering Practice, vol. 21, pp. 1455-1468.
Guerreiro et al., "Trajectory Tracking Nonlinear Model Predictive Control for Autonomous Surface Craft," Proceedings of the European Control Conference, Budapest, Hungary, 6 pages, Aug. 2009.
Guzzella et al., "Introduction to Modeling and Control of Internal Combustion Engine Systems," 303 pages, 2004.
Guzzella, et al., "Control of Diesel Engines," IEEE Control Systems Magazine, pp. 53-71, Oct. 1998.
Hahlin, "Single Cylinder ICE Exhaust Optimization," Master's Thesis, retrieved from https://pure.Itu.se/portal/files/44015424/LTU-EX-2013-43970821.pdf, 50 pages, Feb. 1, 2014.
Havelena, "Componentized Architecture for Advanced Process Management," Honeywell International, 42 pages, 2004.
Heywood, "Pollutant Formation and Control," Internal Combustion Engine Fundamentals, pp. 567-667, 1988.
Hiranuma, et al., "Development of DPF System for Commercial Vehicle—Basic Characteristic and Active Regeneration Performance," SAE Paper No. 2003-1-3182, Mar. 2003.
Hirsch et al., "Dynamic Engine Emission Models," Automotive Model Predictive Control, Chapter 5, 18 pages, LNCIS 402, 2012.
Hirsch et al., "Grey-Box Control Oriented Emissions Models," The International Federation of Automatic Control (IFAC), Proceedings of the 17th World Congress, pp. 8514-8519, Jul. 6-11, 2008.
Hockerdal, "EKF-based Adaptation of Look-Up Tables with an Air Mass-Flow Sensor Application," Control Engineering Practice, vol. 19, 12 pages, 2011.
Honeywell, "Profit Optimizer a Distributed Quadratic Program (DQP) Concepts Reference," 48 pages, prior to Feb. 2, 2005.
http://nexceris.com/news/nextech-materials/, "NEXTECH Materials is Now NEXCERIS," 7 pages, printed Oct. 4, 2016.
http://www.arb.ca.gov/msprog/obdprog/hdobdreg.htm, "Heavy-Duty OBD Regulations and Rulemaking," 8 pages, printed Oct. 4, 2016.
http://www.not2fast.wryday.com/turbo/glossary/turbo_glossary.shtml, "Not2Fast: Turbo Glossary," 22 pages, printed Oct. 1, 2004.
http://www.tai-cwv.com/sbl106.0.html, "Technical Overview-Advanced Control Solutions," 6 pages, printed Sep. 9, 2004.
http://www.dieselnet.com/standards/us/obd.php, "Emission Standards: USA: On-Board Diagnostics," 6 pages, printed Oct. 3, 2016.
Ishida et al., "An Analysis of the Added Water Effect on NO Formation in D.I. Diesel Engines," SAE Technical Paper Series 941691, International Off-Highway and Power-Plant Congress and Exposition, 13 pages, Sep. 12-14, 1994.
Ishida et al., "Prediction of NOx Reduction Rate Due to Port Water Injection in a DI Diesel Engine," SAE Technical Paper Series 972961, International Fall Fuels and Lubricants Meeting and Exposition, 13 pages, Oct. 13-16, 1997.
Jensen, "The 13 Monitors of an OBD System," http://www.oemoffhighway.com/article/1 0855512/the-13-monito . . . , 3 pages, printed Oct. 3, 2016.
Johansen et al., "Hardware Architecture Design for Explicit Model Predictive Control," Proceedings of ACC, 6 pages, 2006.
Johansen et al., "Hardware Synthesis of Explicit Model Predictive Controllers," IEEE Transactions on Control Systems Technology, vol. 15, No. 1, Jan. 2007.
Jonsson, "Fuel Optimized Predictive Following in Low Speed Conditions," Master's Thesis, 46 pages, Jun. 28, 2003.
Kelly, et al., "Reducing Soot Emissions from Diesel Engines Using One Atmosphere Uniform Glow Discharge Plasma," SAE Paper No. 2003-1-1183, Mar. 2003.
Keulen et al., "Predictive Cruise Control in Hybrid Electric Vehicles," World Electric Journal, vol. 3, ISSN 2032-6653, 11 pages, May 2009.
Khair et al., "Emission Formation in Diesel Engines," Downloaded from https://www.dieselnet.com/tech/diesel_emiform.php, 33 pages, printed Oct. 14, 2016.
Kihas et al., "Chapter 14, Diesel Engine SCR Systems: Modeling Measurements and Control," Catalytic Reduction Technology (book), Part 1, Chapter 14, prior to Jan. 29, 2016.
Kolmanovsky et al., "Issues in Modeling and Control of Intake Flow in Variable Geometry Turbocharged Engines", 18th IFIP Conf. System Modeling and Optimization, pp. 436-145, Jul. 1997.

(56) References Cited

OTHER PUBLICATIONS

Krause et al., "Effect of Inlet Air Humidity and Temperature on Diesel Exhaust Emissions," SAE International Automotive Engineering Congress, 8 pages, Jan. 8-12, 1973.
Kulhavy et al. "Emerging Technologies for Enterprise Optimization in the Process Industries," Honeywell, 12 pages, Dec. 2000.
Lavoie et al., "Experimental and Theoretical Study of Nitric Oxide Formation in Internal Combustion Engines," Combustion Science and Technology, vol. 1, pp. 313-326, 1970.
Locker, et al., "Diesel Particulate Filter Operational Characterization," Corning Incorporated, 10 pages, prior to Feb. 2, 2005.
Lu, "Challenging Control Problems and Engineering Technologies in Enterprise Optimization," Honeywell Hi-Spec Solutions, 30 pages, Jun. 4-6, 2001.
Van Keulen et al., "Predictive Cruise Control in Hybrid Electric Vehicles," World Electric Vehicle Journal vol. 3, ISSN 2032-6653, pp. 1-11, 2009.
VDO, "UniNOx-Sensor Specification," Continental Trading GmbH, 2 pages, Aug. 2007.
Vereschaga et al., "Piecewise Affine Modeling of NOx Emission Produced by a Diesel Engine," 2013 European Control Conference (ECC), pp. 2000-2005, Jul. 17-19, 2013.
Wahlstrom et al., "Modelling Diesel Engines with a Variable-Geometry Turbocharger and Exhaust Gas Recirculation by Optimization of Model Parameters for Capturing Non-Linear System Dynamics," (Original Publication) Proceedings of the Institution of Mechanical Engineers, Part D, Journal of Automobile Engineering, vol. 225, No. 7, 28 pages, 2011.
Wang et al., "Fast Model Predictive Control Using Online Optimization," Proceedings of the 17th World Congress, the International Federation of Automatic Control, Seoul, Korea, pp. 6974-6979, Jul. 6-11, 2008.
Wang et al., "PSO-Based Model Predictive Control for Nonlinear Processes," Advances in Natural Computation, Lecture Notes in Computer Science, vol. 3611/2005, 8 pages, 2005.
Wang et al., "Sensing Exhaust NO2 Emissions Using the Mixed Potential Principal," SAE 2014-1-1487, 7 pages, Apr. 1, 2014.
Wilhelmsson et al., "A Fast Physical NOx Model Implemented on an Embedded System," Proceedings of the IFAC Workshop on Engine and Powertrain Control, Simulation and Modeling, pp. 207-215, Nov. 30-Dec. 2, 2009.
Wilhemsson et al., "A Physical Two-Zone NOx Model Intended for Embedded Implementation," SAE 2009-1-1509, 11 pages, 2009.
Winkler et al., "Incorporating Physical Knowledge About the Formation of Nitric Oxides into Evolutionary System Identification," Proceedings of the 20th European Modeling and Simulation Symposium (EMSS), 6 pages, 2008.
Winkler et al., "On-Line Modeling Based on Genetic Programming," 12 pages, International Journal on Intelligent Systems Technologies and Applications 2, 2007.
Winkler et al., "Using Genetic Programming in Nonlinear Model Identification," 99 pages, prior to Jan. 29, 2016.
Winkler et al., "Virtual Sensors for Emissions of a Diesel Engine Produced by Evolutionary System Identification," LNCS, vol. 5717, 8 pages, 2009.
Wong, "CARB Heavy-Duty OBD Update," California Air Resources Board, SAE OBD TOPTEC, Downloaded from http://www.arb.ca.gov/msprog/obdprog/hdobdreg.htm, 72 pages, Sep. 15, 2005.
Wright, "Applying New Optimization Algorithms to Model Predictive Control," 5th International Conference on Chemical Process Control, 10 pages, 1997.
Yao et al., "The Use of Tunnel Concentration Profile Data to Determine the Ratio of NO2/NOx Directly Emitted from Vehicles," HAL Archives, 19 pages, 2005.
Zavala et al., "The Advance-Step NMPC Controller: Optimality, Stability, and Robustness," Automatica, vol. 45, pp. 86-93, 2009.
Zeilinger et al., "Real-Time MPC—Stability Through Robust MPC Design," Joint 48th IEEE Conference on Decision and Control and 28th Chinese Control Conference, Shanghai, P.R. China, pp. 3980-3986, Dec. 16-18, 2009.
Zeldovich, "The Oxidation of Nitrogen in Combustion and Explosions," ACTA Physiochimica U.R.S.S., vol. XXI, No. 4, 53 pages, 1946.
Zelenka, et al., "An Active Regeneration as a Key Element for Safe Particulate Trap Use," SAE Paper No. 2001-0103199, 13 pages, Feb. 2001.
Zhu, "Constrained Nonlinear Model Predictive Control for Vehicle Regulation," Dissertation, Graduate School of the Ohio State University, 125 pages, 2008.
Zhuiykov et al., "Development of Zirconia-Based Potentiometric NOx Sensors for Automotive and Energy Industries in the Early 21st Century: What Are the Prospects for Sensors?", Sensors and Actuators B, vol. 121, pp. 639-651, 2007.
Desantes et al., "Development of NOx Fast Estimate Using NOx Sensor," EAEC 2011 Congress, 2011.
Andersson et al., "Fast Physical NOx Prediction in Diesel Engines, The Diesel Engine: The Low CO2 and Emissions Reduction Challenge," Conference Proceedings, Lyon, 2006.
Winkler, "Evolutionary System Identification—Modem Approaches and Practical Applications," Kepler Universitat Linz, Reihe C: Technik und Naturwissenschaften, Universitatsverlag Rudolf Trauner, 2009.
Smith, "Demonstration of a Fast Response On-Board NOx Sensor for Heavy-Duty Diesel Vehicles," Technical report, Southwest Research Institute Engine and Vehicle Research Division SwRI Project No. 03-02256 Contract No. 98-302, 2000.
Maciejowski, "Predictive Control with Constraints," Prentice Hall, Pearson Education Limited, 4 pages, 2002.
Manchur et al., "Time Resolution Effects on Accuracy of Real-Time NOx Emissions Measurements," SAE Technical Paper Series 2005-1-0674, 2005 SAE World Congress, 19 pages, Apr. 11-14, 2005.
Mariethoz et al., "Sensorless Explicit Model Predictive Control of the DC-DC Buck Converter with Inductor Current Limitation," IEEE Applied Power Electronics Conference and Exposition, pp. 1710-1715, 2008.
Marjanovic, "Towards a Simplified Infinite Horizon Model Predictive Controller," 6 pages, Proceedings of the 5th Asian Control Conference, 6 pages, Jul. 20-23, 2004.
Mehta, "The Application of Model Predictive Control to Active Automotive Suspensions," 56 pages, May 17, 1996.
Mohammadpour et al., "a Survey on Diagnostics Methods for Automotive Engines," 2011 American Control Conference, pp. 985-990, Jun. 29-Jul. 1, 2011.
Moore, "Living with Cooled-EGR Engines," Prevention Illustrated, 3 pages, Oct. 3, 2004.
Moos, "Catalysts as Sensors—A Promising Novel Approach in Automotive Exhaust Gas Aftertreatment," http://www.mdpi.com/1424-8220/10/7/6773htm, 10 pages, Jul. 13, 2010.
Murayama et al., "Speed Control of Vehicles with Variable Valve Lift Engine by Nonlinear MPC," ICROS-SICE International Joint Conference, pp. 4128-4133, 2009.
National Renewable Energy Laboratory (NREL), "Diesel Emissions Control-Sulfur Effects Project (DECSE) Summary of Reports," U.S. Department of Energy, 19 pages, Feb. 2002.
Olsen, "Analysis and Simulation of the Rate of Heat Release (ROHR) in Diesel Engines," MSc-Assignment, 105 pages, Jun. 2013.
Ortner et al., "MPC for a Diesel Engine Air Path Using an Explicit Approach for Constraint Systems," Proceedings of the 2006 IEEE Conference on Control Applications, Munich Germany, pp. 2760-2765, Oct. 4-6, 2006.
Ortner et al., "Predictive Control of a Diesel Engine Air Path," IEEE Transactions on Control Systems Technology, vol. 15, No. 3, pp. 449-456, May 2007.
Pannocchia et al., "Combined Design of Disturbance Model and Observer for Offset-Free Model Predictive Control," IEEE Transactions on Automatic Control, vol. 52, No. 6, 6 pages, 2007.
Patrinos et al., "A Global Piecewise Smooth Newton Method for Fast Large-Scale Model Predictive Control," Tech Report TR2010-02, National Technical University of Athens, 23 pages, 2010.
Payri et al., "Diesel NOx Modeling with a Reduction Mechanism for the Initial NOx Coming from EGR or Re-Entrained Burned

(56) References Cited

OTHER PUBLICATIONS

Gases," 2008 World Congress, SAE Technical Paper Series 2008-1-1188, 13 pages, Apr. 14-17, 2008.
Payri et al., "Methodology for Design and Calibration of a Drift Compensation Method for Fuel-to-Air Ratio," SAE International 2012-1-0717, 13 pages, Apr. 16, 2012.
Pipho et al., "NO2 Formation in a Diesel Engine," SAE Technical Paper Series 910231, International Congress and Exposition, 15 pages, Feb. 25-Mar. 1, 1991.
Qin et al., "A Survey of Industrial Model Predictive Control Technology," Control Engineering Practice, 11, pp. 733-764, 2003.
Querel et al., "Control of an SCR System Using a Virtual NOx Sensor," 7th IFAC Symposium on Advances in Automotive Control, The International Federation of Automotive Control, pp. 9-14, Sep. 4-7, 2013.
Rajamani, "Data-based Techniques to Improve State Estimation in Model Predictive Control," Ph.D. Dissertation, 257 pages, 2007.
Rawlings, "Tutorial Overview of Model Predictive Control," IEEE Control Systems Magazine, pp. 38-52, Jun. 2000.
Ricardo Software, "Powertrain Design at Your Fingertips," retrieved from http://www.ricardo.com/PageFiles/864/WaveFlyerA4_4PP.pdf, 2 pages, downloaded Jul. 27, 2015.
Salval, et al., "Passenger Car Serial Application of a Particulate Filter System on a Common Rail Direct Injection Engine," SAE Paper No. 2000-01-0473, 14 pages, Feb. 2000.
Santin et al., "Combined Gradient/Newton Projection Semi-Explicit QP Solver for Problems with Bound Constraints," 2 pages, prior to Jan. 29, 2016.
Schauffele et al., "Automotive Software Engineering Principles, Processes, Methods, and Tools," SAE International, 10 pages, 2005.
Schilling et al., "A Real-Time Model for the Prediction of the NOx Emissions in DI Diesel Engines," Proceedings of the 2006 IEEE International Conference on Control Applications, pp. 2042-2047, Oct. 4-7, 2006.
Schilling "Model-Based Detection and Isolation of Faults in the Air and Fuel Paths of Common-Rail DI Diesel Engines Equipped with a Lambda and a Nitrogen Oxides Sensor," Doctor of Sciences Dissertation, 210 pages, 2008.
Shahzad et al., "Preconditioners for Inexact Interior Point Methods for Predictive Control," 2010 American Control Conference, pp. 5714-5719, Jun. 30-Jul. 2010.
Shamma, et al. "Approximate Set-Valued Observers for Nonlinear Systems," IEEE Transactions on Automatic Control, vol. 42, No. 5, May 1997.
Signer et al., "European Programme on Emissions, Fuels and Engine Technologies (EPEFE)—Heavy Duty Diesel-Study," International Spring Fuels and Lubricants Meeting, SAE 961074, May 6-8, 1996.
Soltis, "Current Status of NOx Sensor Development," Workshop on Sensor Needs and Requirements for PEM Fuel Cell Systems and Direct-Injection Engines, 9 pages, Jan. 25-26, 2000.
Stefanopoulou, et al., "Control of Variable Geometry Turbocharged Diesel Engines for Reduced Emissions," IEEE Transactions on Control Systems Technology, vol. 8, No. 4, pp. 733-745, Jul. 2000.
Stewart et al., "A Model Predictive Control Framework for Industrial Turbodiesel Engine Control," Proceedings of the 47th IEEE Conference on Decision and Control, 8 pages, 2008.
Stewart et al., "A Modular Model Predictive Controller for Turbodiesel Problems," First Workshop on Automotive Model Predictive Control, Schloss Muhldorf, Feldkirchen, Johannes Kepler University, Linz, 3 pages, 2009.
Storset et al., "Air Charge Estimation for Turbocharged Diesel Engines," vol. 1 Proceedings of the American Control Conference, 8 pages, Jun. 28-30, 2000.
Stradling et al., "The Influene of Fuel Properties and Injection Timing on the Exhaust Emissions and Fuel Consumption of an Iveco Heavy-Duty Diesel Engine," International Spring Fuels and Lubricants Meeting, SAE 971635, May 5-8, 1997.
Takacs et al., "Newton-Raphson Based Efficient Model Predictive Control Applied on Active Vibrating Structures," Proceeding of the European Control Conference 2009, Budapest, Hungary, pp. 2845-2850, Aug. 23-26, 2009.
The MathWorks, "Model-Based Calibration Toolbox 2.1 Calibrate complex powertrain systems," 4 pages, prior to Feb. 2, 2005.
The MathWorks, "Model-Based Calibration Toolbox 2.1.2," 2 pages, prior to Feb. 2, 2005.
Theiss, "Advanced Reciprocating Engine System (ARES) Activities at the Oak Ridge National Lab (ORNL), Oak Ridge National Laboratory," U.S. Department of Energy, 13 pages, Apr. 14, 2004.
Tondel et al., "An Algorithm for Multi-Parametric Quadratic Programming and Explicit MPC Solutions," Automatica, 39, pp. 489-497, 2003.
Traver et al., "A Neural Network-Based Virtual NOx Sensor for Diesel Engines," 7 pages, prior to Jan. 29, 2016.
Tschanz et al., "Cascaded Multivariable Control of the Combustion in Diesel Engines," The International Federation of Automatic Control (IFAC), 2012 Workshop on Engine and Powertrain Control, Simulation and Modeling, pp. 25-32, Oct. 23-25, 2012.
Tschanz et al., "Control of Diesel Engines Using NOx-Emission Feedback," International Journal of Engine Research, vol. 14, No. 1, pp. 45-56, 2013.
Tschanz et al., "Feedback Control of Particulate Matter and Nitrogen Oxide Emissions in Diesel Engines," Control Engineenng Practice, vol. 21, pp. 1809-1820, 2013.
Turner, "Automotive Sensors, Sensor Technology Series," Momentum Press, Unable to Obtain the Entire Book, a Copy of the Front and Back Covers and Table of Contents are Provided, 2009.
Van Basshuysen et al., "Lexikon Motorentectinit," (Dictionary of Automotive Technology) published by Vieweg Verlag, Wiesbaden 039936, p. 518, 2004. (English Translation).
Van Den Boom et al., "MPC for Max-Plus-Linear Systems: Closed-Loop Behavior and Tuning," Proceedings of the 2001 American Control Conference, Arlington, VA, pp. 325-330, Jun. 2001.
Van Heiden et al., "Optimization of Urea SCR deNOx Systems for HD Diesel Engines," SAE International 2004-01-0154, 13 pages, 2004.

\* cited by examiner

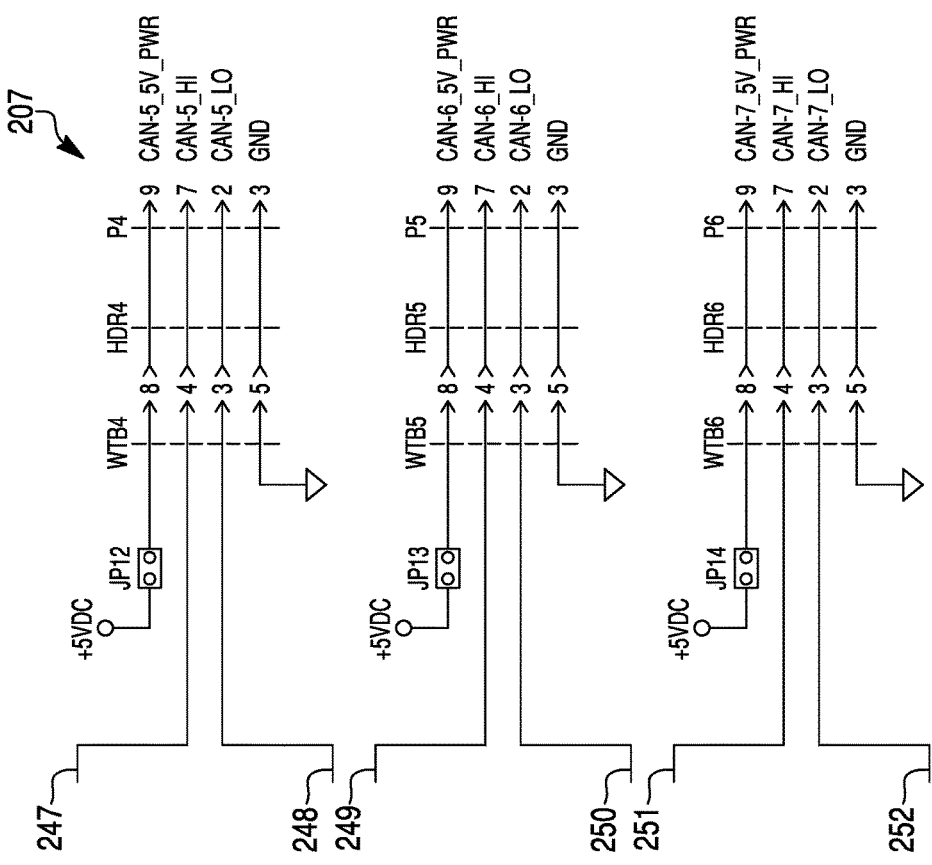

VEHICLE SECURITY MODULE SYSTEM

BACKGROUND

The present disclosure pertains to vehicle electronics and particularly to on board diagnostics systems.

SUMMARY

The disclosure reveals a vehicle security system having controller area network buses, electronic control units connected to the controller area network buses, a vehicle security module connected to the controller area network buses, and an on board diagnostics connector connected to the vehicle security module. The vehicle security module may according to a policy discriminate between authorized and unauthorized signals that are input to the on board diagnostics connector. Authorized signals may be forwarded by the vehicle security module to the controller area network busses. Authorized signals may affect operation of one or more of the components of the vehicle via the electronic control units. Authorized signals may change the policy used by the vehicle security module. Unauthorized signals may be refused entry to the controller area network busses. The on board diagnostics connector may receive the signals from diagnostic instrumentation, control instrumentation, tracking instrumentation, a dongle, and so forth.

BRIEF DESCRIPTION OF THE DRAWING

FIGS. 10a through 10j are diagrams of enlarged portions of the circuitry in FIG. 9.

DESCRIPTION

Figure 1:
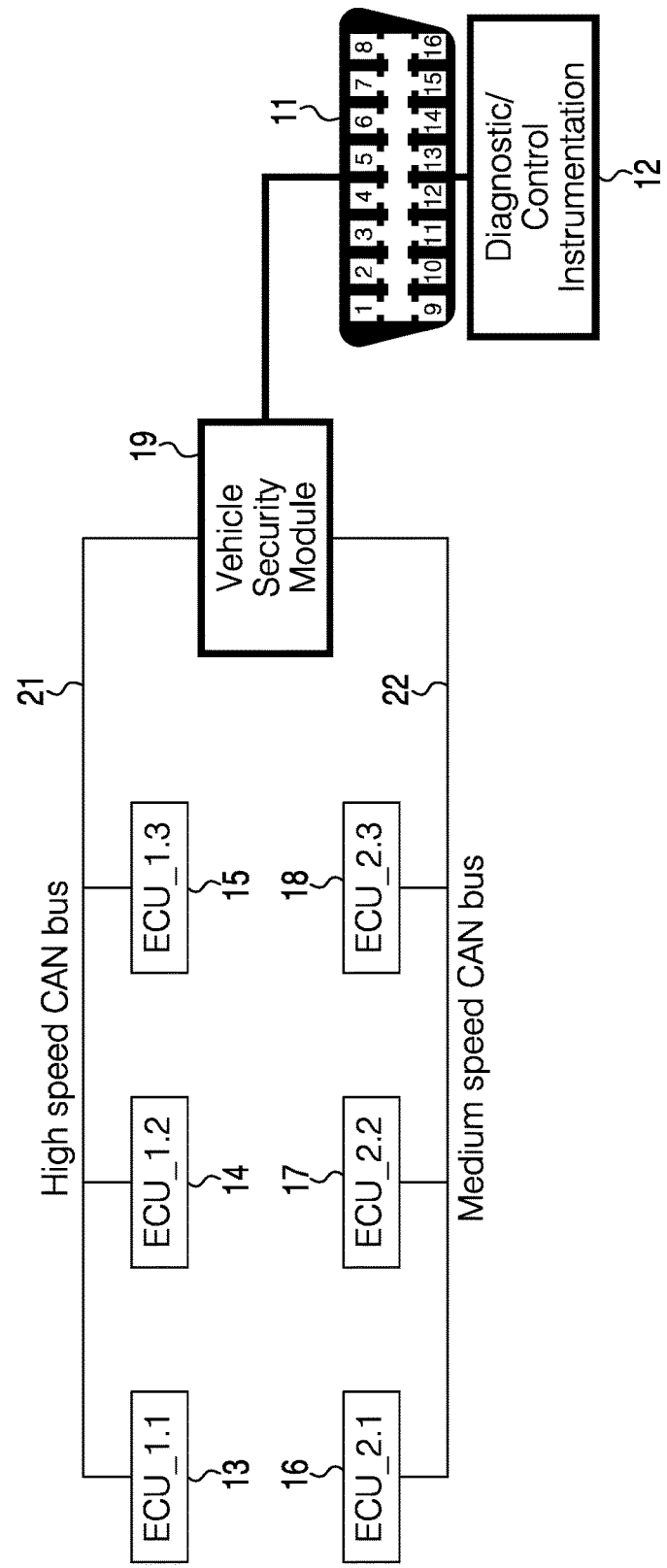
FIG. 1 is a diagram of an on board diagnostics computer arrangement for a vehicle.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Reference may be made to symbols in the drawing. Symbols may have virtually any shape (e.g., a block) and may designate hardware, objects, activities, steps, procedures, and other items.

The idea pertains to vehicle security modules, and how to keep unauthorized intruders out of them while letting in legitimate individuals (e.g., authorized mechanics). At a high level, the present system and approach may propose an electronic key system that gives a vehicle manufacturer an ability to dictate who can get into a vehicle security module (VSM), and once in, which portions or bits of it they can change. The vehicle manufacture may be regarded as an original equipment manufacturer (OEM). The terms may be used herein interchangeably.

The system and approach use unique authorization "tokens" that dictate exactly what level of access is granted to the VSM and/or what changes can be made to the VSM policy, and may have, for example, a public/private key pairing that is used to ensure only an authorized entity is using the token. There may be several ways to ensure that the authorization token is securely passed to and accepted by the VSM.

On-board diagnostics (OBD) is an automotive term referring to a vehicle's self-diagnostic and reporting capability. OBD systems may appear in many cars and light trucks on the road today. Present OBD's may provide almost complete engine control and also monitor parts of the chassis, body and accessory devices, as well as a diagnostic control network of the car. Modern OBD implementations may use a standardized digital communications port or connector to provide real-time data in addition to a standardized series of diagnostic trouble codes (DTCs), which may allow one to rapidly identify and remedy malfunctions within the vehicle.

The present system may use an authorization token in its device. The system does not necessarily need an internet connection. The internet connection may be appropriate for a vehicle in a repair shop but it may not necessarily be appropriate for a vehicle operating on the open road with an insurance or tuning dongle.

The system does not necessarily only allow the diagnostic tool to select from pre-existing roles which have been programmed into an electronic control unit (ECU) or vehicle security module. The system may allow a flexible modification of a base security policy such that new features or access profiles not anticipated at the time of ECU manufacture can be supported by the present approach. In addition, if a security flaw is discovered in the base security policy, the present approach may be used to modify the policy to reduce the risk of compromise.

The present approach does not necessarily require a set of role-based policies in each ECU. The present approach may enforce a policy at the VSM. Thus, the present approach may prevent a device at the OBD II port from injecting traffic on the controller area network CAN bus. Thus, non-diagnostic commands, like turning the steering wheel, unlocking doors, and so forth, may not necessarily be sent to a vehicle via the OBD II within the present scheme. The present system may filter messages which may be destined to be injected into a CAN bus.

FIG. 1 is a diagram of an on board diagnostics (OBD) computer arrangement for a vehicle. An interface or connector 11 may provide an input for diagnostic or control instrumentation, such as a dongle. Instrumentation 12 may be provide an input for control or programming of electronic control units (ECUs) 13, 14 and 15 on a high speed CAN bus 21, and ECUs 16, 17 and 18 on a medium speed CAN bus 22. Between the ECUs and interface 11 may be a VSM 19 that can restrict access to the ECUs' inputs and outputs. VSM 19 may incorporate a gateway that is integrated in the VSM electronics. What is permitted in terms of inputs and outputs to buses 21 and 22, and the respective ECUs 13-18, may be based on policy.

Vehicle manufacturers may need the ability to manage issues such as liability by limiting how a device or software application can modify the operation of a vehicle while at the same time meeting laws and owner expectations related to the right to repair and modify of the vehicle. The present system and approach may allow the vehicle manufacturer to manage vehicle safety/security policy and associated liability by controlling when and which portions of the policy are enforced. Thus, the vehicle manufacturer may be allowed to selectively modify the policy in the vehicle.

Figure 2:
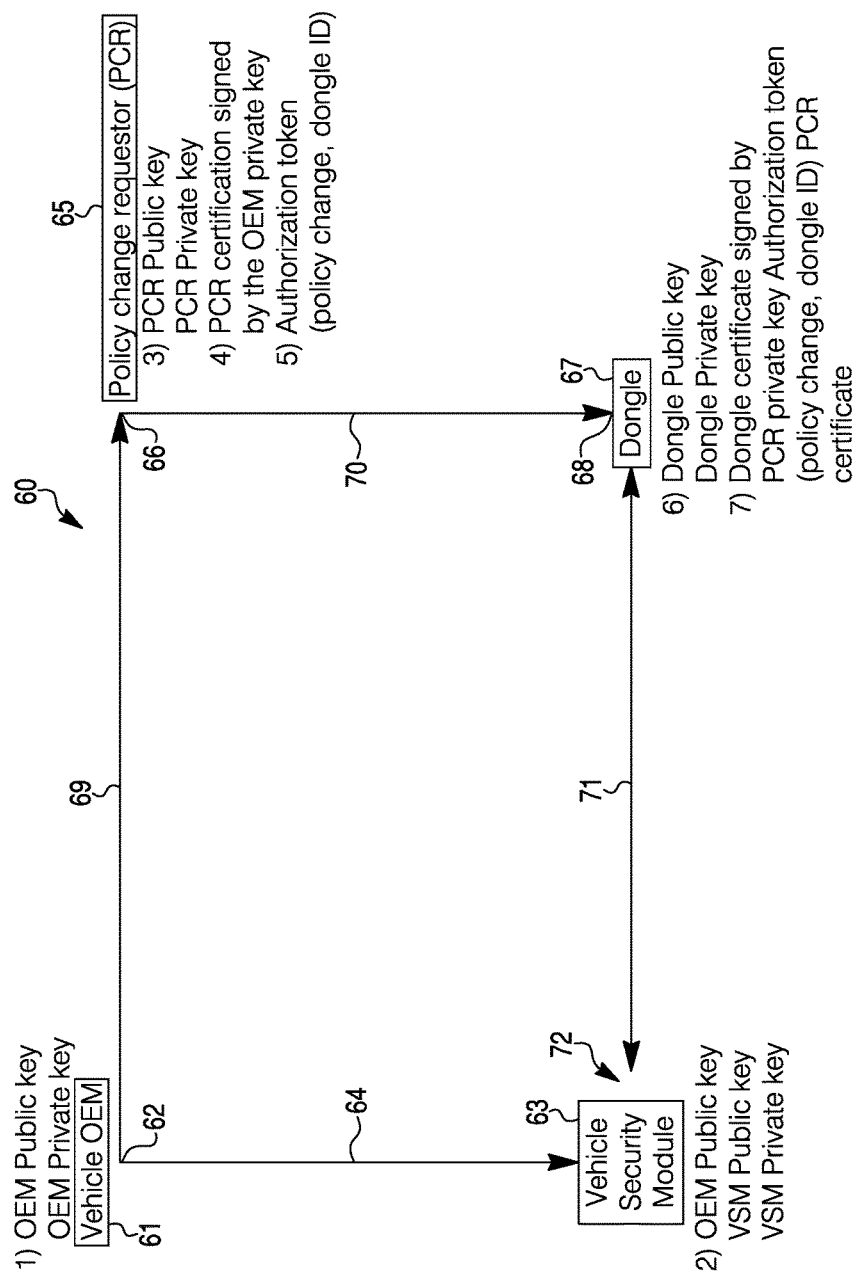
FIG. 2 is a diagram of an interaction of a vehicle original equipment manufacturer, policy change requestor, vehicle security module and instrumentation such as a dongle.

There may be many variations for securely distributing a policy change authorization token to the vehicle security module. One approach may incorporate a dongle pair. An example is given in the following. Key creation and loading of authorization token into dongle may occur. Public key material and a corresponding public key infrastructure may be created as shown in view of a diagram 60 in FIG. 2, the following items: 1) An original equipment manufacturer (OEM) 61 may create a public/private key pair at corner 62 of diagram 60; 2) A vehicle security module 63 may also create its own public/private key pair; OEM 61 may embed along line 64 the OEM public key into vehicle security module 63; 3) A policy change requestor (PCR) 65 may create a public/private key pair at a corner 66 at an end of a line 69 from corner 62 of diagram 60; 4) OEM 61 may use the OEM private key to digitally sign a certificate (e.g., X.509v3) containing a PCR 65 identity and a PCR public key; 5) Vehicle OEM 61 may create a policy change authorization token which includes the changes to the policy and a dongle ID of a set of dongles associated with this authorization token; the authorization token may be signed using the OEM private key; 6) A public/private key pair may be created for a dongle 67 at corner 68 of a line 70 from corner 66 of diagram 60; and 7) PCR 65 may use the PCR private key to sign a certificate for dongle 67 containing the dongle ID, and PCR 65 may also load a copy of the PCR certificate into dongle 67.

An authorization token use may be noted. When dongle 67 is plugged into a vehicle, there may be a protocol exchange along a line 71 between corners 68 and 72, which allows the vehicle security module 63 to confirm the identity of dongle 67, allows the vehicle security module 63 to confirm that the authorization token is bound to dongle 67, and allows the vehicle security module 63 to confirm that the authorization token was authorized by vehicle OEM 61.

There may be multiple ways that the above-noted three confirmations may be achieved. One approach may be primarily described in the following paragraphs.

1) A dongle and a vehicle may perform a Diffie Hellman key exchange using the dongle certificate to establish a shared secret between the dongle and a vehicle security module. This may be a cryptographic handshake protocol. Other variations of the key exchange, besides the Diffie Hellman exchange noted herein, may be used.

2) The dongle may send the vehicle security module an authorization token and an integrity check value. Both of these items may be cryptographically protected using a key derived from the Diffie Hellman exchange.

3) The vehicle security module may use the key derived from, for instance, the Diffie Hellman exchange to validate an integrity check value. If the check is valid, then the vehicle security module may know that the dongle has the same key derived from the Diffie Hellman exchange.

4) The vehicle security module may then "walk the chain" of public key certificates from the dongle to a common root of trust (i.e., an OEM private key in this example). Assuming that the checks produce an expected result, the vehicle security module may know that this dongle is the dongle it claims to be.

5) The vehicle security module may the use an OEM public key to validate a digital signature on an authorization token. Assuming the digital signature to be valid, the vehicle security module may know that the authorization token is authorized by the vehicle OEM.

6) At this point, the vehicle security module may know that the dongle ID from the dongle certificate, it may know the dongle is authentic because of a successful Diffie Hellman key exchange and it may know that the policy changes contained in the authorization token are valid and apply to the specified dongle ID. Thus, the vehicle security module may make changes in its policy.

Variations in the above-described process, which produce a similar, result may incorporate:

1) A cryptographic algorithm—the public key algorithm may be an RSA (a Rivest Shamir Adelman public key cryptography algorithm) or an elliptic curve.

2) A cryptographic key length—various public key pairs (OEM, dongle vendor, dongle, and so forth) may use different key lengths.

3) A certificate structure—the certificates may be X.509 v3 certificates or a proprietary format.

4) A PKI—the PKI (private key infrastructure) may be a simple structure in which the OEM serves as its own root of trust (also known as a root certificate authority). The system may use a larger and more complete PKI in which the root of trust is above the OEM. This type of structure may allow one dongle to be recognized by vehicle security modules associated with multiple OEMs.

5) A key establishment protocol—many different protocols may exist to establish secure communications between the dongle and the VSM.

6) An authorization token distribution—the authorization token may be distributed via the dongle such that the dongle is the transport mechanism. The authorization token may be embedded in the VSM firmware and activated when an authorized dongle authenticates itself to the VSM. The authorization token may be fetched in real time by either the VSM or the dongle.

7) An authorization token structure—the structure of the policy override may be virtually a complete replacement of the default VSM policy. Alternatively, the structure may simply identify changes to a default policy. A set of changes may be bundled as a single package containing one or more changes. Alternatively, the changes may be packaged as one change per token such that a dongle could have multiple tokens associated with it.

A feature of the present system and approach may be that the security and/or safety policy in the vehicle security module could be changed in the field using a cryptographically protected authorization token which is directly or indirectly associated with a dongle.

The vehicle security module may be shipped with a default security policy. The policy may specify the types of messages allowed to flow to and/or from the vehicle to a device plugged into an on board diagnostics II (OBD) port. An authorization token may specify changes to be applied to the policy when the device associated with the authorization token is plugged in.

There may be many ways of specifying a policy. One example of a policy, along with an authorization token changing the policy, may be provided in the following:

1) A default vehicle security module policy—block messages with a CAN bus ID=1, 2, 3, 4, 5;
2) An authorization token—allow messages with a CAN bus ID=3; and
3) A resulting policy—block messages with the CAN bus ID=1, 2, 4, 5.

Another example may be given where the incoming message ID should match allowed rules in order to pass. A set mask may be used to determine which bits of the message ID are compared to the filter. A "0" in the mask may mean that the corresponding bits of the message ID are not tested. The filter value may be matched against the incoming message ID and if the non-masked bits match, the message is allowed to pass.

Figure 3:
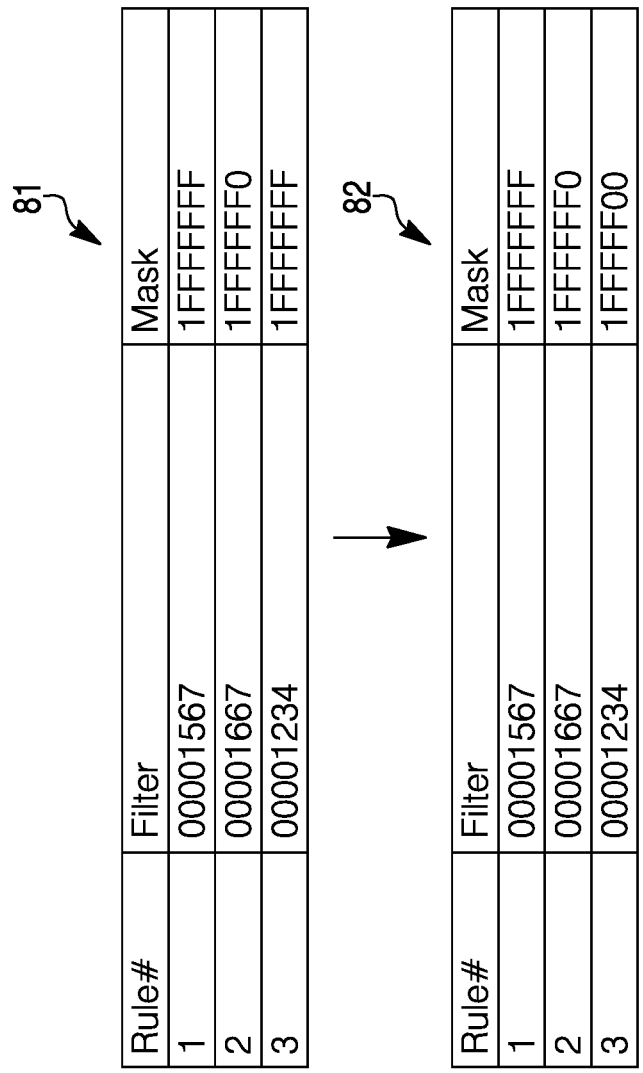
FIG. 3 is a diagram of tables illustrating a default vehicle security module and authorization token change of the policy.

Default vehicle security module policy may be schematically shown in table 81 in FIG. 3. An authorization token may be a rule 3, with a new mask 1FFFFF00. A resulting policy may be shown in table 82.

There may be many types of policies. Many vehicle manufacturers may use proprietary messages on the CAN bus so the policy is likely to be different for each vehicle manufacturer. Examples may incorporate safety and security.

For safety, one may assume that a message ID 5 with content 0000 0000 0000 1111 tells the brake system to vent pressure from the wheel cylinders. This may be done to bleed air out of the hydraulic brake system. A safety policy may block message ID=5, content 0000 0000 0000 1111 from being injected via the OBD port. This may prevent a compromised dongle from disabling the brakes on a vehicle. A tool certified by the OEM to be used by a service technician to bleed the brakes may have an authorization token which turns off this policy, thus allowing the service technician to bleed the brakes. If another device (e.g., a compromised insurance dongle) is plugged into the OBD port after the technician has serviced the vehicle, the safety policy may prevent the compromised dongle from issuing the bleed brakes command to the vehicle. The authorization token should be only in effect while the device linked to the authorization token is plugged into the OBD port.

For security, a keyless entry system on a vehicle may be able to send a CAN bus message to unlock the doors. However, a compromised dongle may also send an unlock command, allowing a thief into the vehicle. Therefore, a security policy in the vehicle security module may be to block "unlock door" messages sent into the vehicle via the OBD port.

The CAN bus does not necessarily perform source authentication of messages placed on the CAN bus. Thus, an attacker who is able to inject messages into the OBD port could send messages which appear to come from one of the electronic control units (ECUs) on the bus. Referring to the FIG. 1, if the vehicle security module is not present, the dongle may be able to place messages on the CAN bus which could be sent by ECU 13-15 or ECU 16-18. Thus, anything that the ECUs may do could be done by an attacker via the OBD. A few of the many things the attacker could do via the OBD port may be to flash headlights, unlock doors, turn air conditioning on/off, activate anti-lock brake functions, turn the front wheels (on a vehicle with automatic parking capability), change the speed shown on the speedometer, and so on.

Some types of policy changes that could be requested for a dongle or other OBD device may incorporate allowing a dongle to limit the speed of a vehicle, which might be used in fleet management applications, allowing the device to load new firmware on an ECU, allowing the dongle to read GPS coordinates of a vehicle so that the dongle can provide vehicle tracking, allowing a dongle to remotely start the engine of a vehicle, and allowing the device to send a command to change the emissions control setting on a vehicle.

An authorization token may take many forms depending upon the structure used for specifying policy within the vehicle security module. Data fields that may be typical in the authorization token could incorporate the following items.

1) Applicable vehicles—a device/dongle may be allowed to change the policy on vehicles produced, for example, since 2015. The device/dongle should only be licensed with the OEM to be used on certain models and therefore the authorization token may identify a set of licensed vehicles.
2) A policy/rule identifier—depending upon how the OEM manages policy/rules in the vehicle security module, the token may specify a number identifying the rule which is to be modified or turned off (e.g., turn off rule 3).
3) An allowable message ID list—many firewalls and vehicle security modules may operate using a "deny unless explicitly allowed" model. Thus, if the policy does not explicitly allow a message ID, then that message ID may be blocked. The allowable message ID field may specify additional IDs which are allowed to pass.
4) Specific message ID/value pairs—frequently there may be multiple parameters within a message. For example, one byte may control the throttle position while another byte in the same message may control the amount of fuel delivered. The default policy may allow a message "ID x" but only allow a specific set of parameters. For instance, it may only allow a byte specifying the amount of fuel to be between, for example, 10 and 100. However, the policy may allow an authorized device to change these parameter limits.

The present system and approach may allow the vehicle manufacturer to manage vehicle safety/security policy by controlling when and which portions of the policy are enforced. The system may consist of the following entities. The vehicle manufacturer may set the default safety and security policies for the vehicle. The vehicle manufacturer may also be able to selectively authorize "policy change requestors" (PRCs) to override a policy under specific circumstances. A vehicle may be any motorized cyber-physical system used for transportation. The term "vehicle" may incorporate automobiles, military vehicles, autonomous (self-driving) vehicles, water craft, and aircraft having manned and unmanned (e.g., drones) capabilities. A policy change requestor may be an entity requesting a change to the vehicle safety and/or security policy. The requestor could be the owner of a vehicle or a service technician requesting a change to one vehicle. For instance, the owner may be a "tuner" who wants to modify how the vehicle performs. The tuner may be a manufacturer of diagnostic equipment, a dongle provider, or a developer of a software application. An authorization token may directly or indirectly identify the changes which the policy change requestor is authorized to make to a specific vehicle or a class of vehicles. For example, a dongle provider may receive a token to make changes to particular model pick-up trucks model produced during certain years. A structure of the authorization token may depend on how the vehicle manufacturer has implemented the authorization and the structure of associated policies.

The present system and approach may allow a vehicle manufacturer to grant a policy change requestor an ability to make selective changes to the safety/security policy of one or more vehicles.

Figure 4:
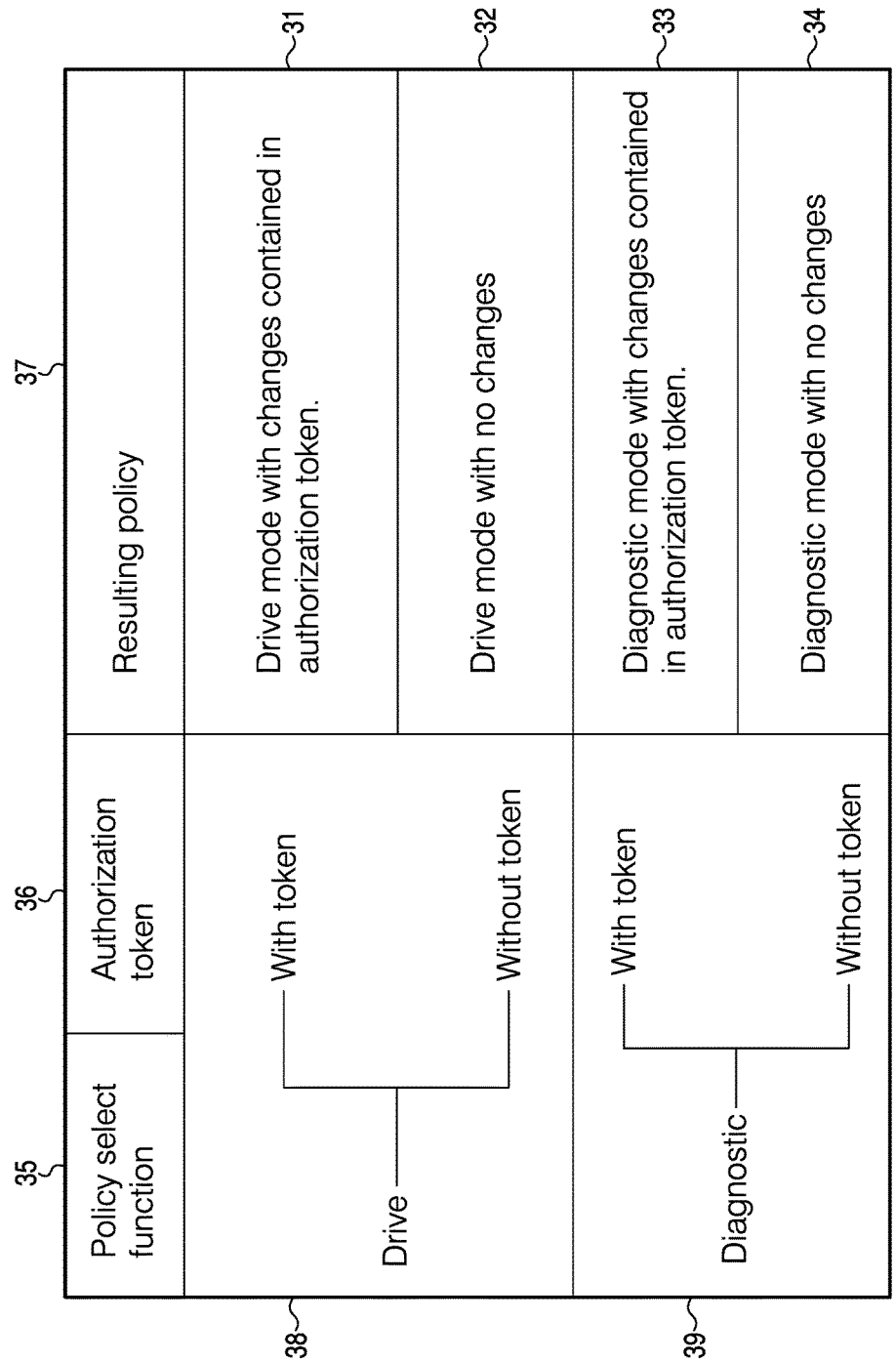
FIG. 4 is a diagram of a table illustrating a policy selection, an authorization token selection and a resulting policy of various selections.

A diagram of FIG. 4 may illustrate selections of the system. The system may include a policy selection function 35 on the vehicle which incorporates a drive function or mode 38 and diagnostic function or mode 39. An authorization token 36 may be selected as with a token or without a token for drive function 38 and for diagnostic function 39 of the vehicle. Resulting policies 31, 32, 33 and 34 may be from selections of a drive or diagnostic mode and an authorization token. Policy 31 may involve a drive mode with changes contained in the authorization token. Policy 32 may involve the drive mode with no changes in view of being without the authorization token. Policy 33 may involve a diagnostic mode with changes contained in the authorization token. Policy 34 may involve the diagnostic mode with no changes in view of being without the authorization token.

The policy select function 35 on a vehicle may be implemented via a physical switch or another mechanism which is resistant to hacking or jamming. In one implementation, the vehicle may contain a physical vehicle security module (VSM) which enforces the security policy. The VSM may contain a physical switch which the driver or technician can place in either drive mode 38 or diagnostics mode 39. When in diagnostics mode 39, the VSM may emit a signal (e.g., beeping or flashing light) to warn a vehicle operator that the safety and/or security policy normally enforced when the vehicle is in drive mode has been bypassed.

Figure 5:
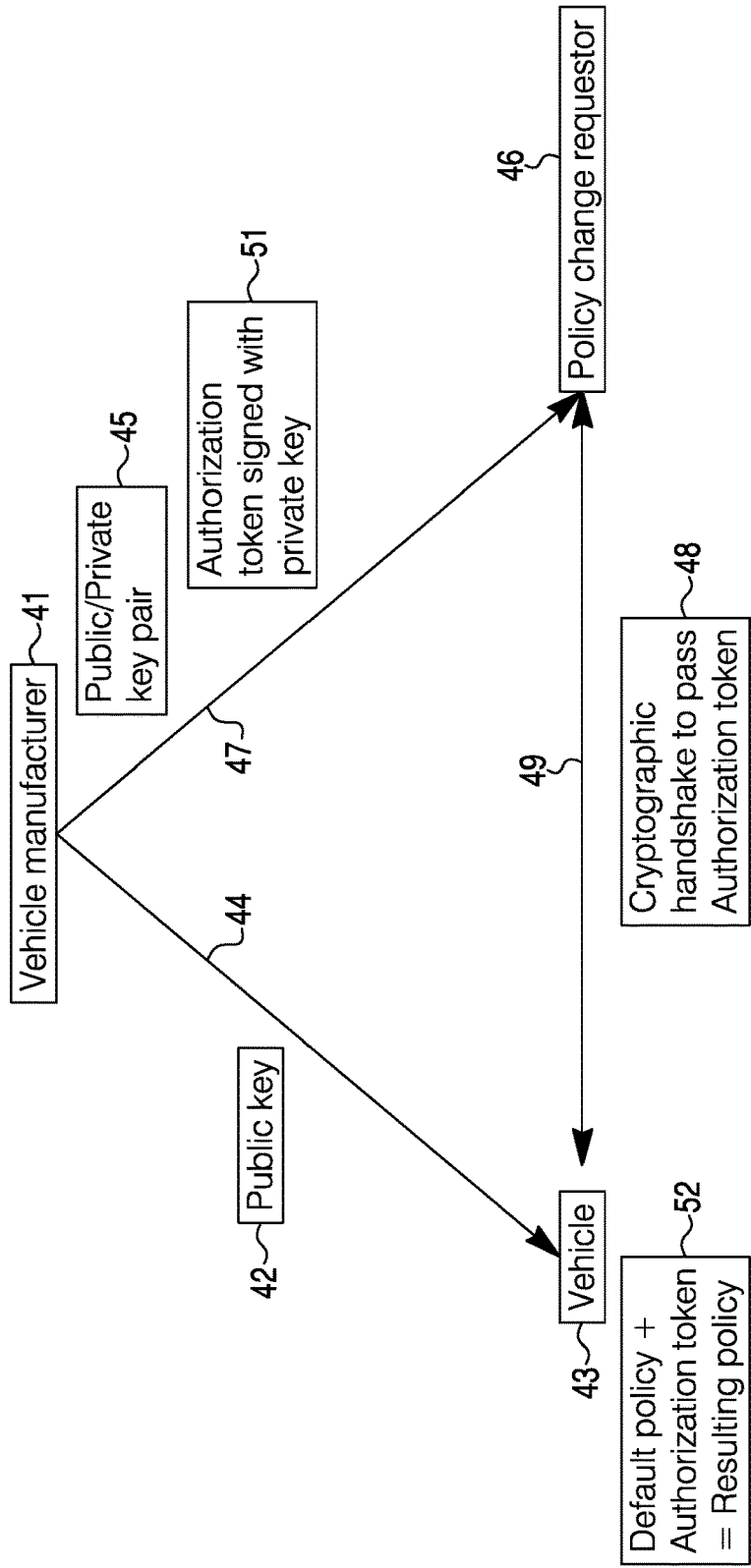
FIG. 5 is a diagram showing an example implementation of an authorization token.

The authorization token may be implemented in multiple ways. One implementation may make use of public key cryptography to create an authorization token which could be bound to a device or application (e.g., an insurance dongle) and which may be cryptographically verified by the vehicle. One such implementation may be illustrated in a diagram of FIG. 5. A vehicle manufacturer 41 may create a public/private key pair 45 using the techniques of asymmetric cryptography. Vehicle manufacturer 41 may place a public key 42 in each vehicle as indicated by an arrow 44. Vehicle manufacturer 41 may maintain control of the private key and protect it from compromise.

A developer of the policy change requestor 46 (could be hardware or software) and vehicle manufacturer 41 may agree on a set of authorized policy changes to be granted to policy change requestor 46 for specified vehicles as indicated by an arrow 47. An agreement may involve testing, legal agreements or other activities outside the scope of the present system. Vehicle manufacturer 41 may then use its private key to cryptographically sign an authorization token 51 bound along arrow 47 to policy change requestor 46. When policy change requestor 46 wants to modify the default policy on the vehicle, policy change requestor 46 and vehicle 43 may perform a cryptographic handshake to pass the authorization token 48 to vehicle 43 along arrow 49. Vehicle 43 may use public key 42 provided by vehicle manufacturer 41 to validate the authorization token. Once validated, the changes contained in the authorization token may be applied to the default policy to produce the resulting policy 52 to be enforced by vehicle 43.

There may be multiple ways to securely pass an authorization token to the vehicle. Some of the ways may be noted herein. One way is that the vehicle manufacturer may act as a certificate authority and sign a certificate (e.g., X.509 v3) for a developer of the policy change requester. This approach may allow the policy change requester to use a local private key to generate and sign authorization tokens. The vehicle may then use the vehicle manufacturer public key to "walk the certificate chain" to validate the authorization token.

Another way is that the vehicle manufacturer may create authorization tokens which combine an identity of the policy change requestor with the authorization token as an approach of binding the token to the requestor.

Still another way is that the vehicle manufacturer may distribute a new policy directly to the vehicle with a mechanism to identify policy change requestors which are authorized to invoke the policy.

Yet another way is that the automotive industry may adopt a full public key infrastructure (PKI) which would allow vehicles from many manufacturers to validate policy change requestor entities from multiple developers.

There may be additional ways in which a policy associated with a specific policy change requestor could be loaded into a vehicle security module. A feature of the present system is that the vehicle manufacturer may have a way to alter the vehicle safety/security policy based upon the knowledge of a policy change requestor being associated with the vehicle.

A vehicle manufacturer may require a manufacturer of a policy change requestor (e.g., a dongle or diagnostic test tool) to use a key storage mechanism to protect the integrity and/or confidentiality of the cryptographic material used within the system.

A policy change requester (e.g., a dongle device plugged into a vehicle's OBD port) should perform a cryptographic handshake with the vehicle to ensure that it is a genuine (authorized) requester and not an imposter. An example of an imposter may be a look alike dongle from an unauthorized source. This look alike device may not necessarily meet the safety or security requirements set by the vehicle manufacturer.

This would allow OEMs to control what devices get added to their vehicles in order to preserve safety and security. This is a feature of the present system that would differentiate the present system from the competition.

Figure 6:
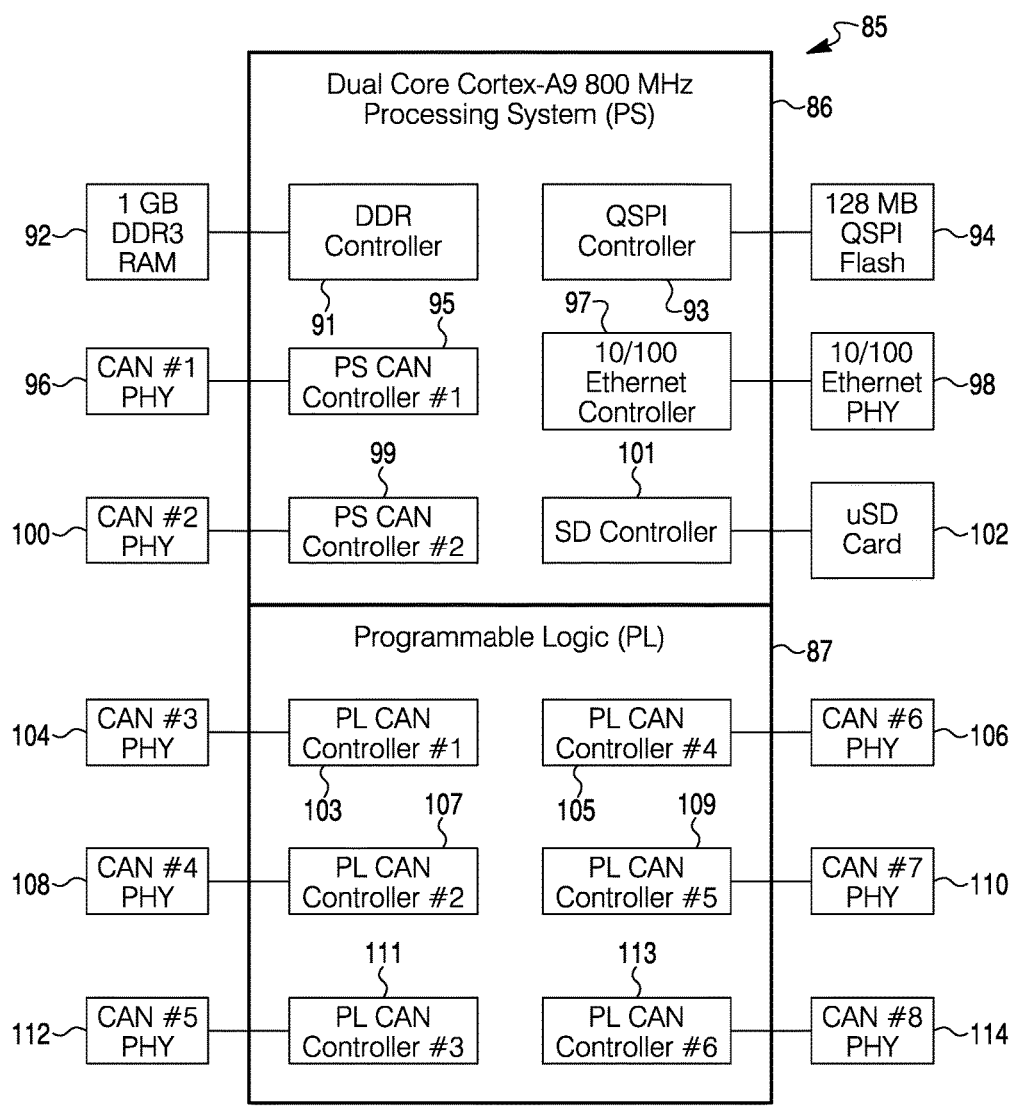
FIG. 6 is a diagram of a vehicle security module circuit board.

FIG. 6 is a diagram of a vehicle security module circuit board 85. The present vehicle security module hardware may be based upon a MicroZed™ Zynq module. A security policy may run on an ARM Cortex™ A9 MPCore. This chip may have two CPU cores so that security can run on either of these two CPU cores. A security policy file, which can be updated via the authorization token, may be stored in, for example, a 256 Kbyte on-chip memory. The present system and approach may use other CPUs or microcontrollers. In general, the security policy may be stored in a memory on or connected to a microcontroller. The policy may be enforced by software or firmware on the CPU which can read the policy from the memory and apply the policy.

As to some details, board 85 may contain a dual core Cortex-A9 800 MHZ processing system (PS) 86 and a programmable logic card (PL) 87. PS 86 may incorporate a double data rate (DDR) controller 91 connected to a 1 GB DDR RAM 92, a quad serial peripheral interface (QSPI) 93 connected to a 128 MB QSPI flash 94, a processing system (PS) controller area network (CAN) controller (#1) 95 connected to a CAN #1 physical (PHY) 96. A 10/100 Ethernet controller 97 connected to a 10/100 Ethernet PHY 98, a PS CAN controller, (#2) 99 connected to a CAN #2 PHY 100, and a secured digital (SD) 101 connected to a micro SD card 102.

PL card 87 may incorporate a PL CAN controller (#1) 103 connected to a CAN (#3) 104, a PL CAN controller (#4) 105 connected to a CAN #6 PHY 106, a PL CAN controller (#2) 107 connected to a CAN #4 PHY 108, a PL CAN controller (#5) connected to a CAN #7 PHY 110, a PL CAN controller (#3) connected to a CAN #5 PHY, and PL CAN controller (#6) 113 connected to a CAN #8 PHY 114.

Figure 7:
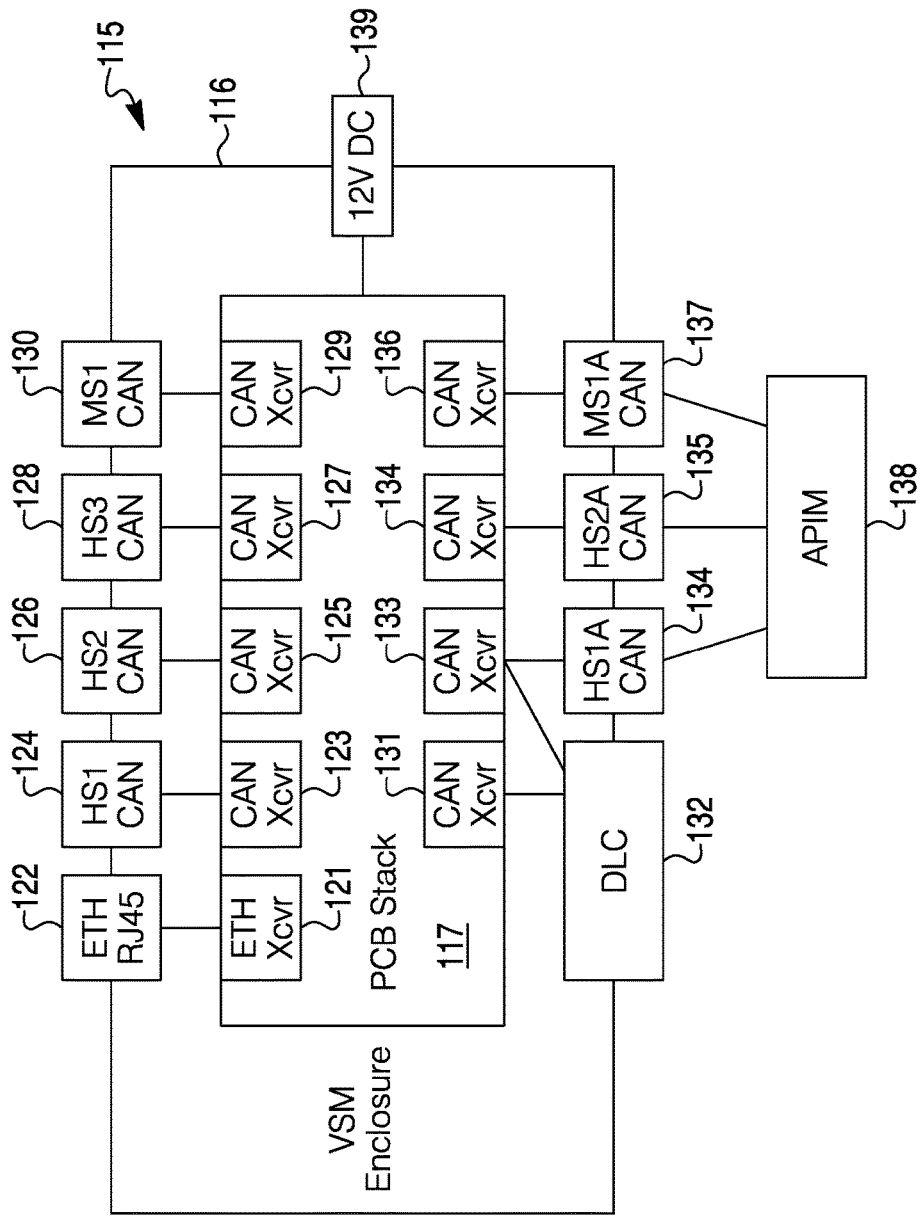
FIG. 7 is a diagram of interfaces to the vehicle security module.

FIG. 7 is a diagram of the interfaces to the vehicle security module. The diagram may reveal an interface to a VSM 115 having an enclosure 116 with a printed circuit board (PCB) stack 117. PCB stack 117 may incorporate an Ethernet (ETH) transceiver (Xcvr) 121 connected to an ETH RJ45 connector 122, a CAN Xcvr 123 connected to a high speed 1 (HS1) CAN 124, a CAN Xcvr 125 connected to an HS2 CAN 126, a CAN Xcvr 127 connected to an HS3 CAN 128, and a CAN Xcvr 129 connected to a medium speed 1 (MS1) CAN 130, a CAN Xcvr 131 connected to a diagnostic link connector (DLC) (aka OBD II), 132, a CAN Xcvr 133 connected to DLC 132 and to a high speed 1 auxiliary (HS1A) CAN 134, a CAN Xcvr 134 connected to a HS2A CAN 135, and a CAN Xcvr 136 connected to a medium speed 1 auxiliary (MS1A) CAN 137. HS1A CAN 134, HS2A CAN 135, and MS1A CAN 137 may be connected to an accessory protocol interface module (APIM) 138. A 12 VDC power source 139 may be connected and used to power components of the PCB stack 117.

Figure 8:
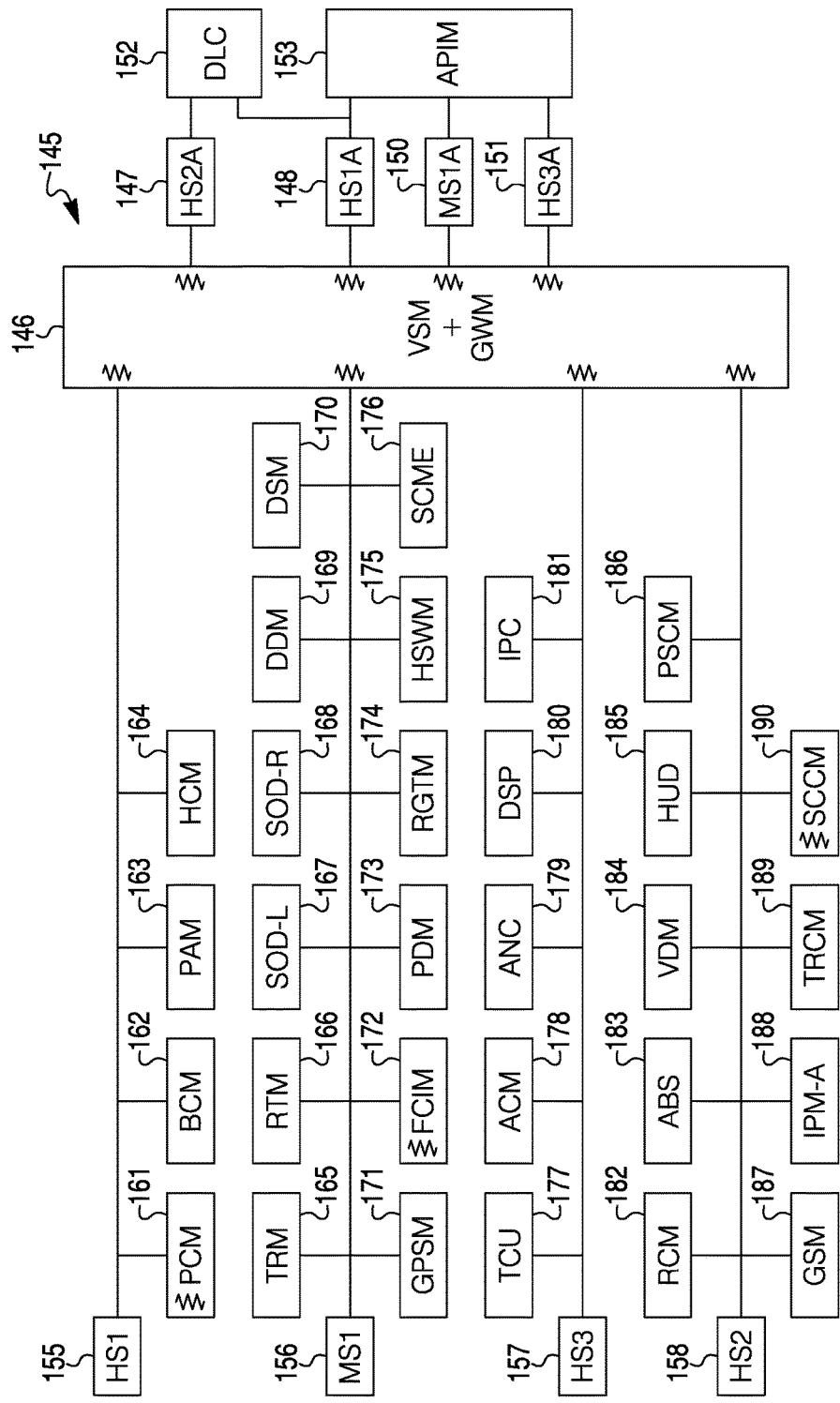
FIG. 8 is a diagram of an example architecture modified for a vehicle security module.

FIG. 8 is a diagram of an example an OBD architecture 145 such as for a Lincoln MKZ vehicle by Ford Motor Co., modified to incorporate a vehicle security module. The following description is an example of CAN busses and ECUs. There may be various other architecture designs. An HS2A 147, HS1A 148, MS1A 150 and HS3A 151 may be connected to a VSM and a gateway module (GWM) 146. A DLC 152 may be connected to HS2A 147 and HS1A 148. An APIM 153 may be connected to HS1A 148, MS1A 150 and HS3A 151. VSM and GWM 146 may be connected to HS1 155, MS1 156, HS3 157, and HS2 158. HS1, HS2, HS3, MS1, HS1A, HS2A, HS3A and MS1A refer to CAN busses.

Various modules may be connected to the busses. Some of the modules connected to HS1 155 may be a PCM (powertrain control module) 161, BCM (battery control module-accessories) 162, PAM (parking aid module) 163 and HCM (headlamp control module) 164.

Some of the modules connected to MS1 may be a TRM (transmission range module) 165, RTM 166, SOD-L (side object detection-left module) 167, SOD-R (side object detection-right module) 168, DDM (driver's door module) 169, DSM (driver's seat module) 170, GPSM (global positioning system module) 171, FCIM (front controls interface module) 172, PDM 173, RGTM 174, HSWM (heated steering wheel module) 175 and SCME 176.

Some of the modules connected to HS3 may be TCU (transmission control unit) 177, ACM (audio control module) 178, ANC (auxiliary heater control) 179, DSP (digital signal processing module) 180, and IPC (instruments panel control) 181.

Some of the modules connected to HS2 may be RCM (restraint control module) 182, ABS (anti-lock brake system) 183, VDM (vehicle dynamics module) 184, HUD (heads up display) 185, PSCM (power steering control module) 186, GSM 187, IPM-A (instrument panel module-accessories) 188, TRCM 189, and SCCM (steering column control module) 190.

The ECUs of architecture 145 may be other than indicated. Some of the acronyms may designate other items than those mentioned, depending on, for instance, the model and year of the vehicle.

Figure 9:
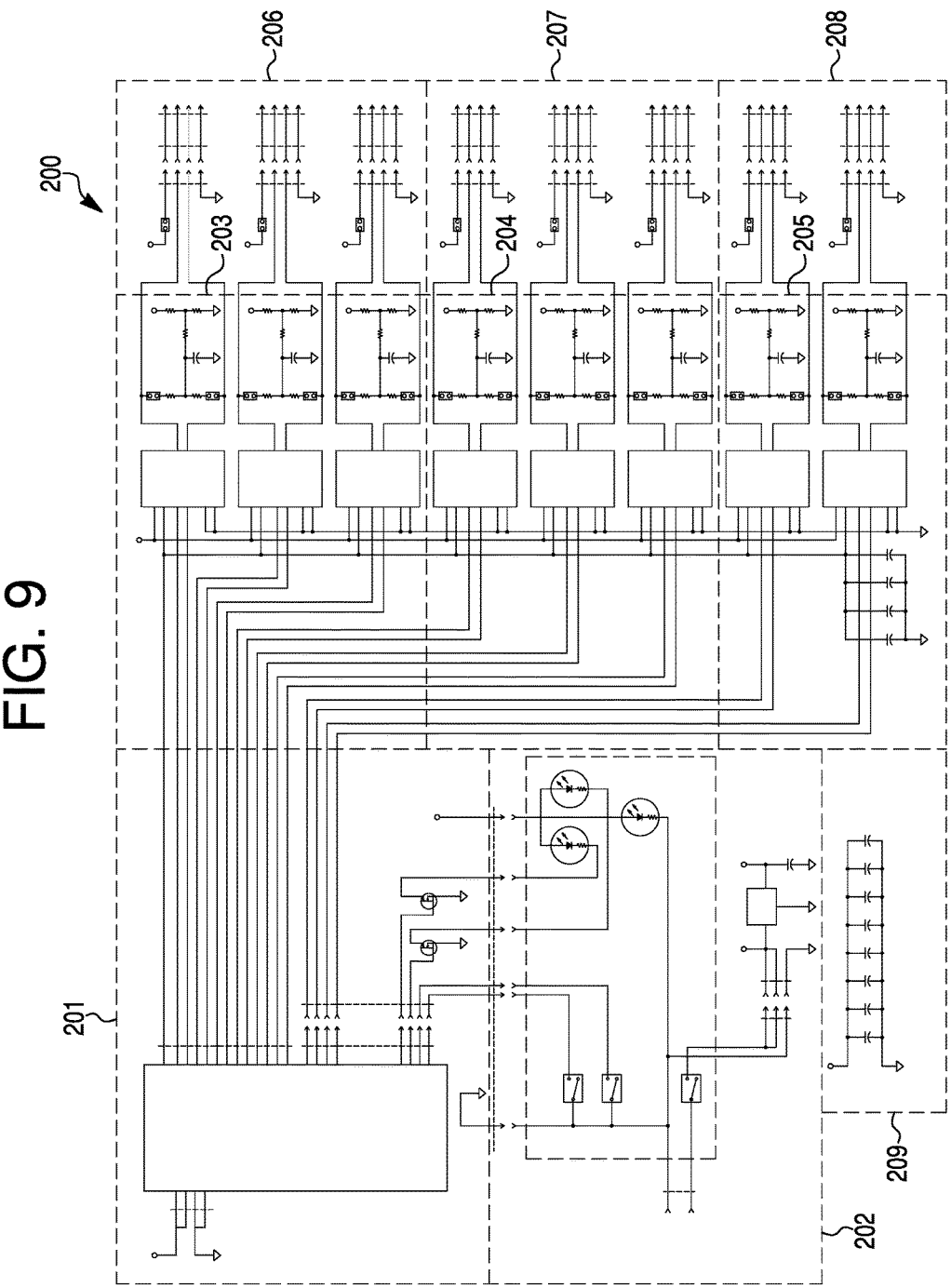
FIG. 9 as a diagram of an example of circuitry for a vehicle security module.
Figure 10A:
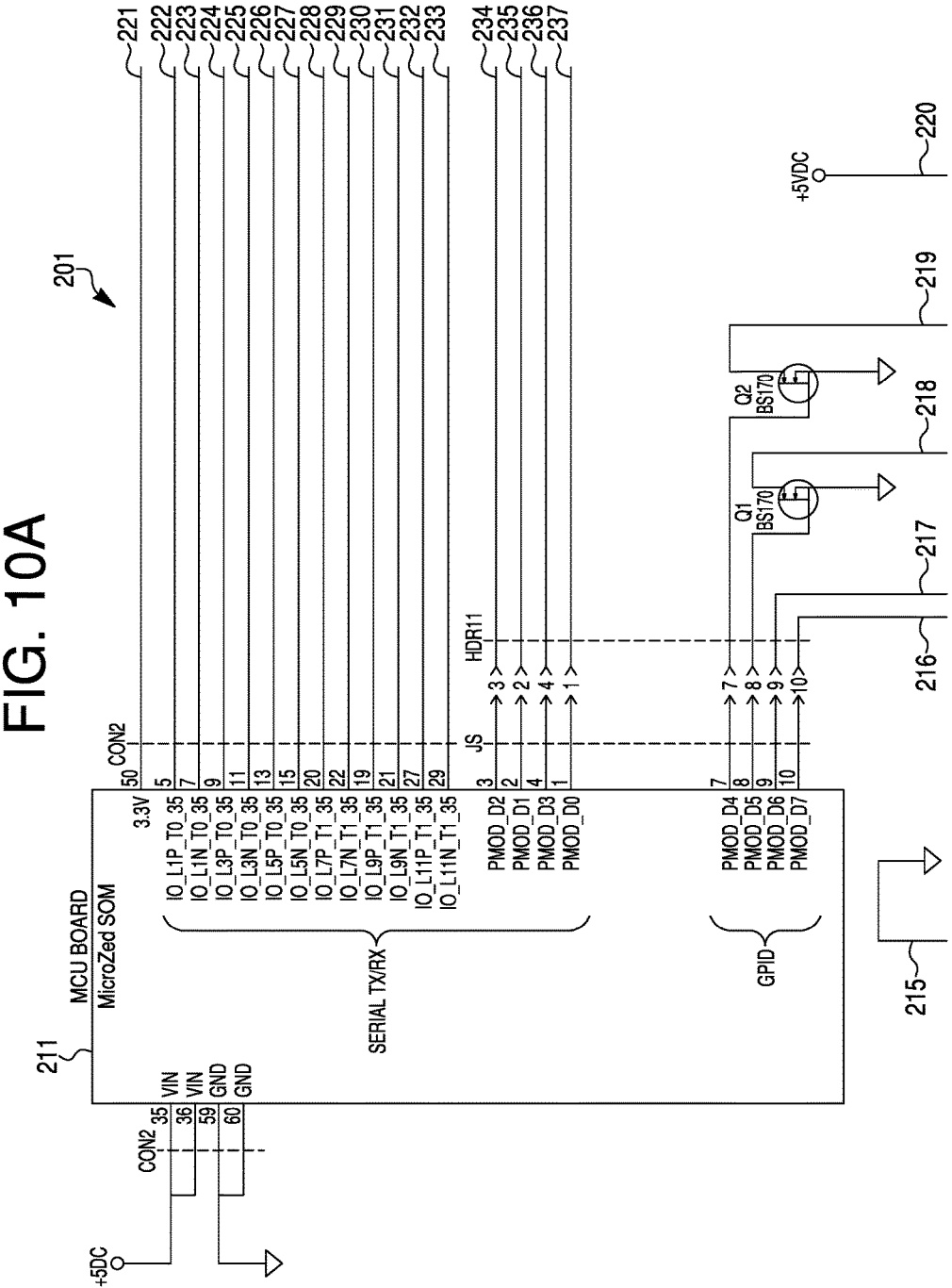
Figure 10B:
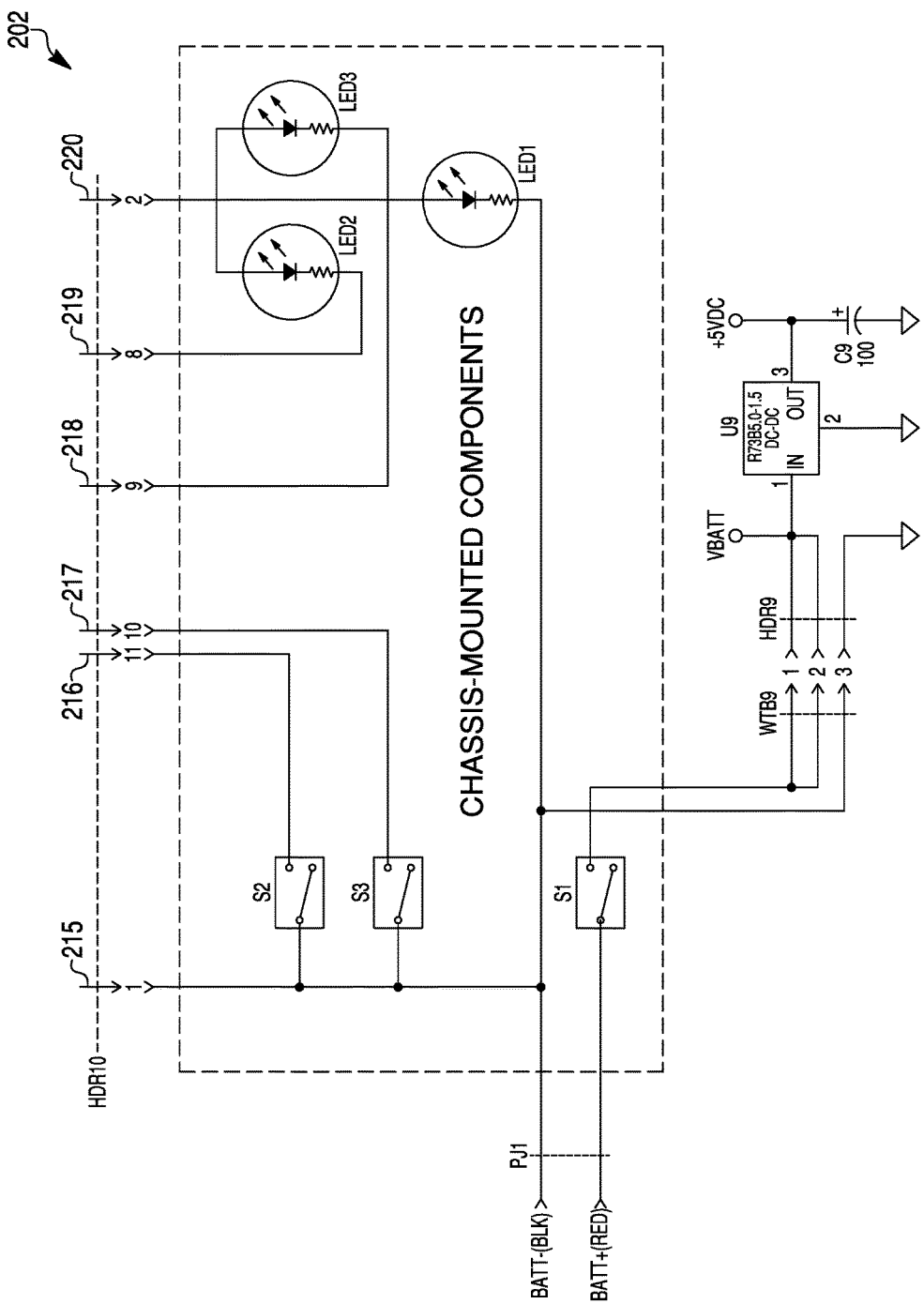

FIG. 9 is a diagram of an example of VSM circuitry 200 that may be incorporated in the present system. The diagram is divided into portions 201-209 that are enlarged in FIGS. 10a-10i, respectively. FIG. 10a is a diagram of portion 201 that has an MCU board 211 which may be, for example, a MicroZed™ SCM. An SCM of another source may utilized as the MCU board 211. Connections of portion 201 with portion 202 in FIG. 10b may be indicated by lines 215, 216, 217, 218, 219 and 220. Portions 203-205 may incorporate CAN transceivers connected to MCU board 211 and to output circuitry, respectively. Connections of portion 201 with portion 203 in FIG. 10c may be indicated by lines 221, 222, 223, 224, 225, 226, 227, 228, 229, 230, 231, 232, 233, 234, 235, 236 and 237. Connections of portion 203 of FIG. 10c with portion 204 in FIG. 10d may be indicated by lines 228, 229, 230, 231, 232, 233, 234, 235, 236, 237, 238, 239 and 240. Connections of portion 204 of FIG. 10d with portion 205 in FIG. 10e may be indicated by lines 234, 235, 236, 237, 238, 239 and 240.

Figure 10C:
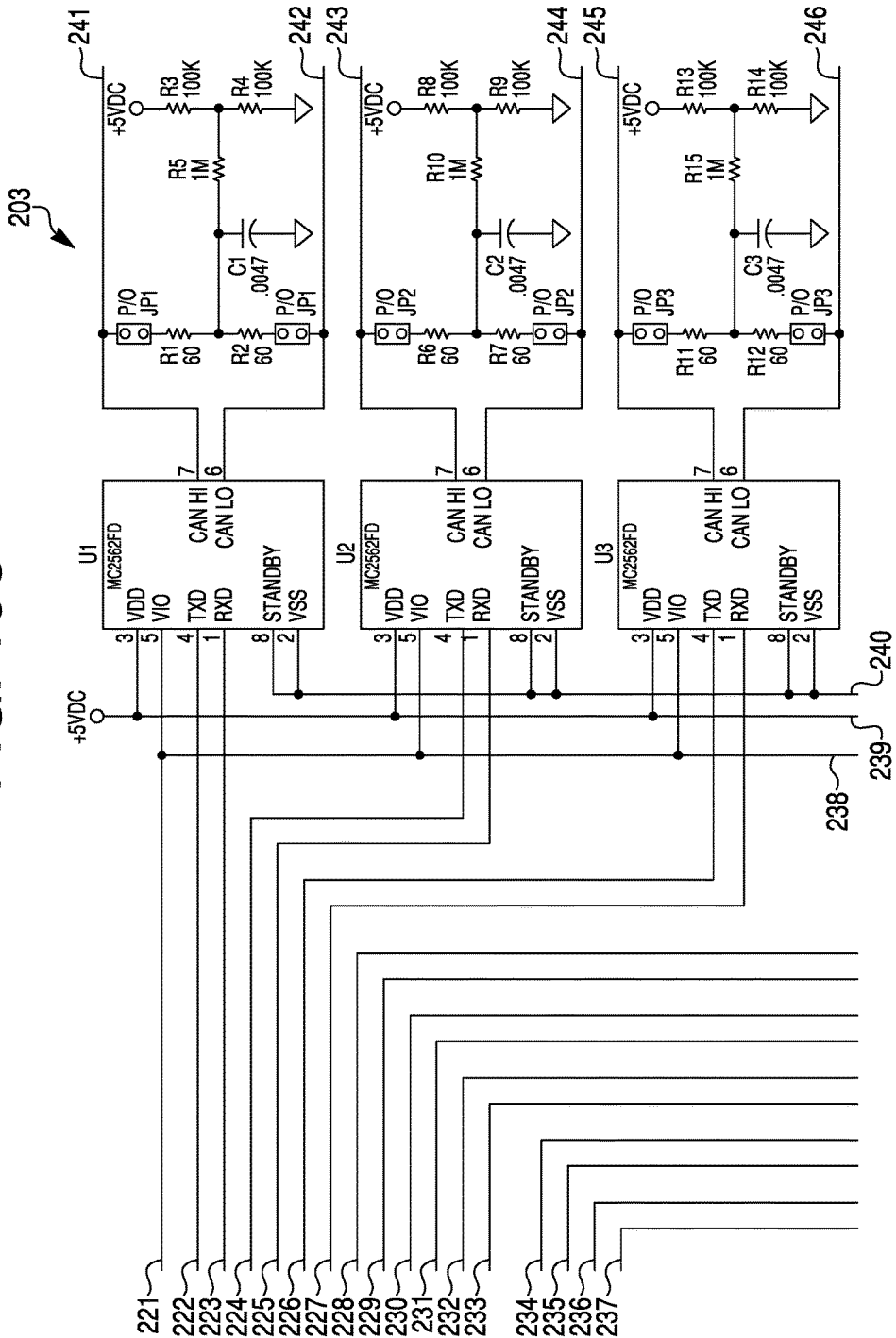
Figure 10D:
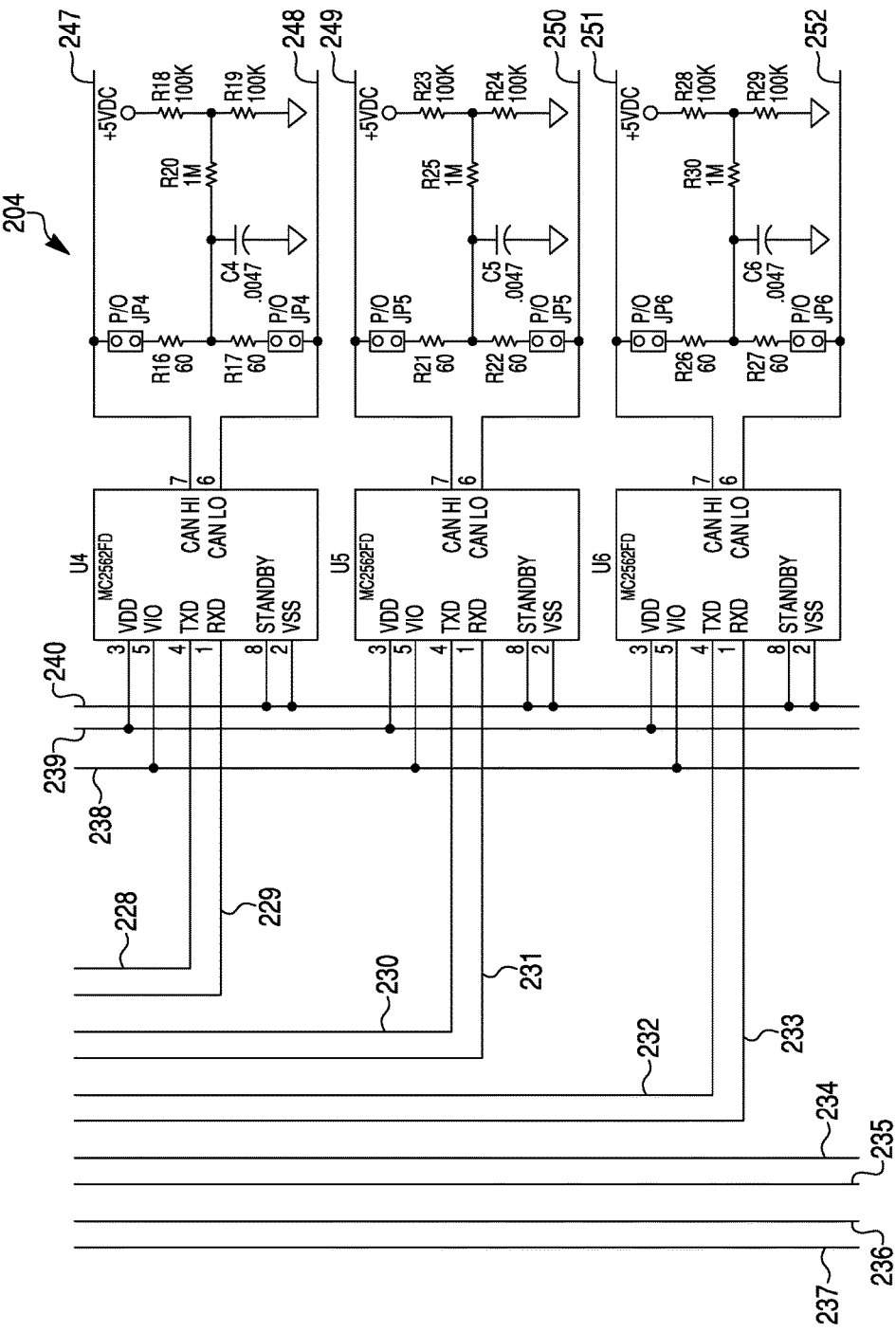
Figure 10E:
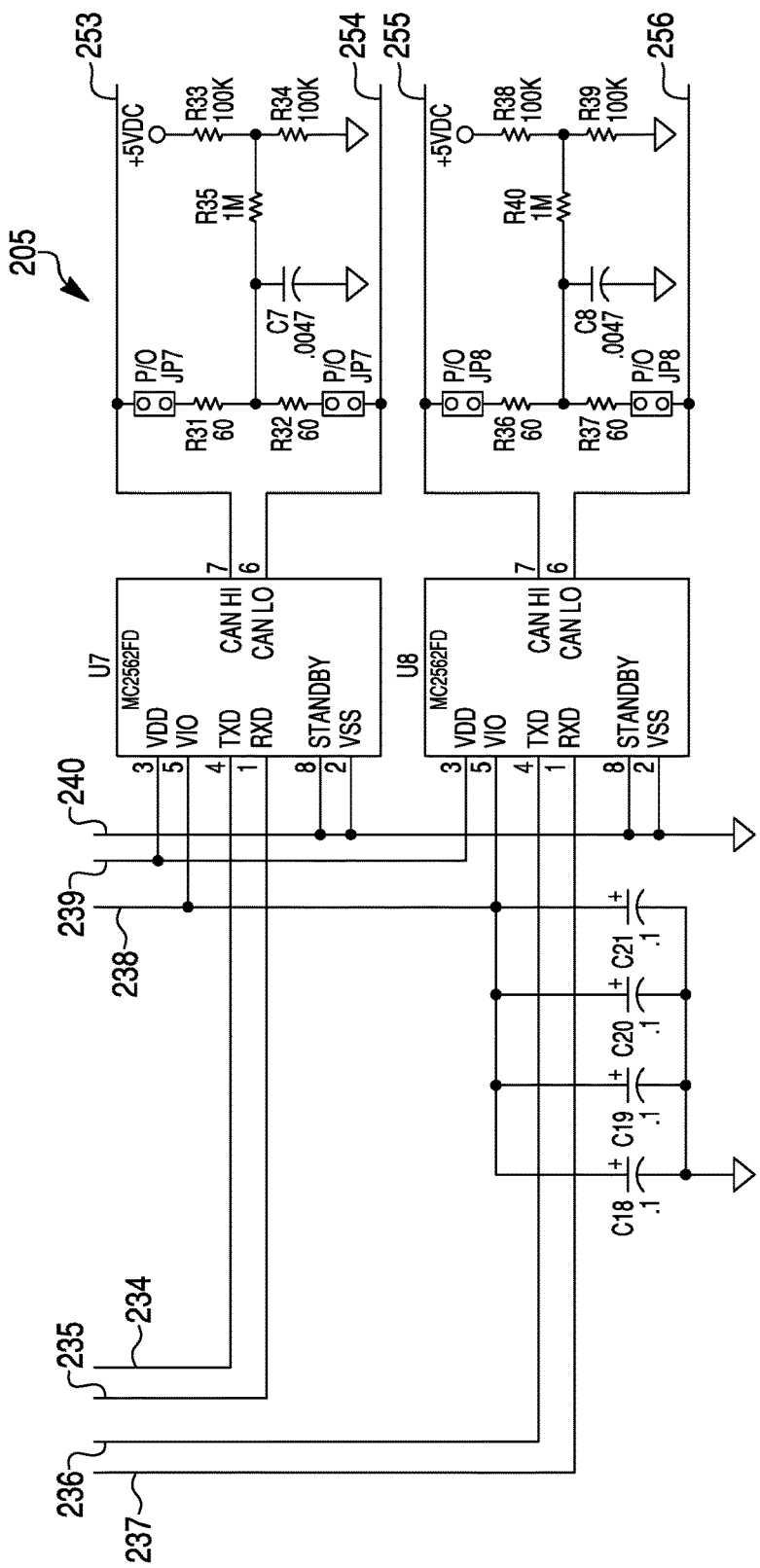
Figure 10F:
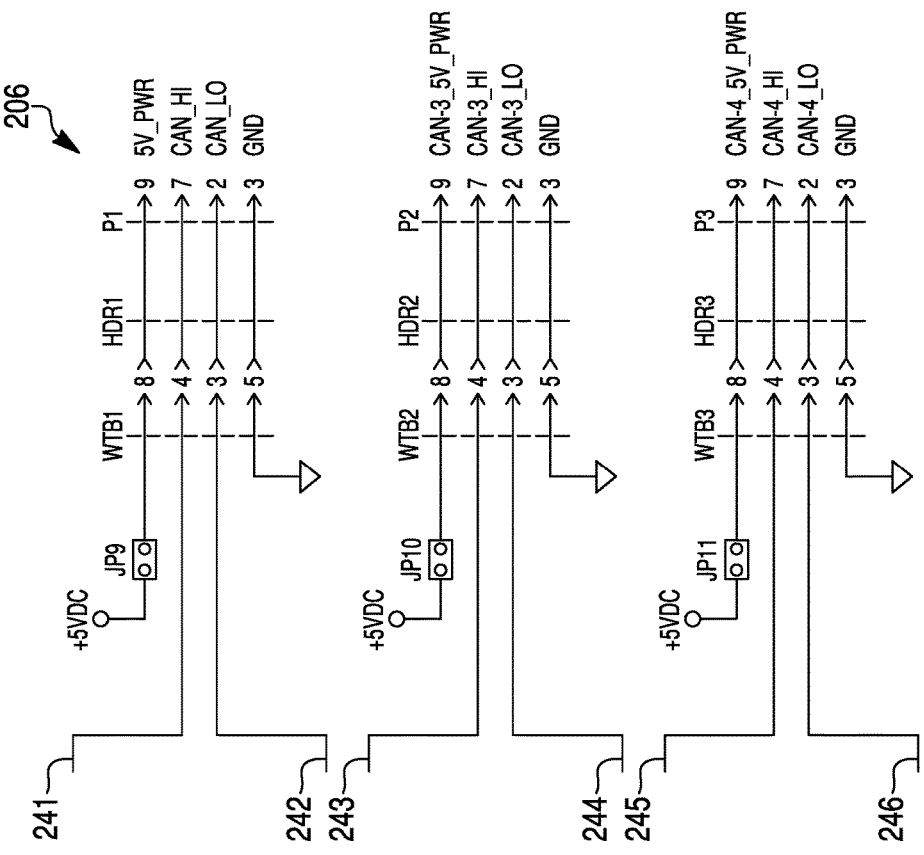
Figure 10H:
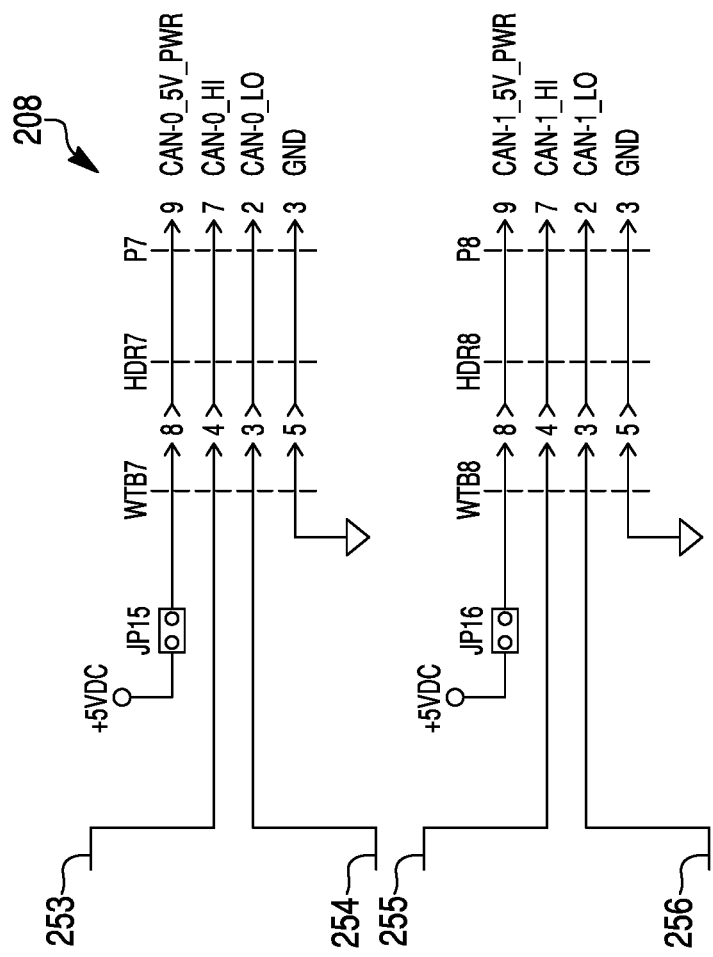

Connections of portion 203 in FIG. 10c with portion 206 in FIG. 10f may be indicated by lines 241, 242, 243, 244, 245 and 246. Connections of portion 204 in FIG. 10d with portion 207 in FIG. 10g may be indicated by lines 247, 248, 249 250, 251 and 252. Connections of portion 205 in FIG. 10e with portion 208 in FIG. 10h may be indicated by lines 253, 254, 255 and 256.

Figure 10I:
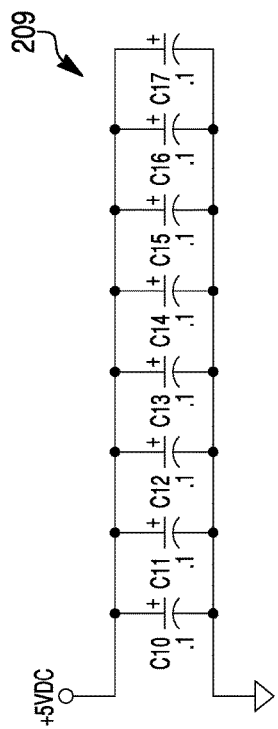
Figure 10J:
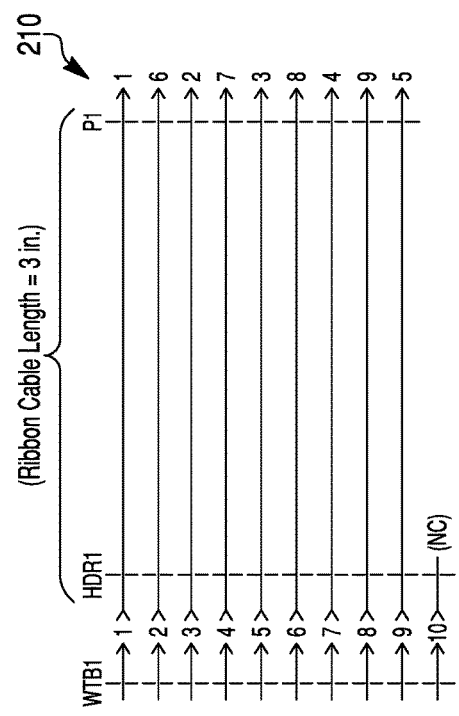

FIG. 10i is a diagram of a filter circuit 209 for power to VSM circuitry 200. FIG. 10j is a diagram of an example of a cable for each of the outputs of the circuits in portions 205-208.

To recap, a vehicle security system may incorporate one or more controller area network (CAN) buses, one or more electronic control units (ECUs) connected to the one or more CAN buses, a vehicle security module (VSM) connected to the one or more CAN buses, and an on board diagnostics (OBD) connector connected to the vehicle security module. The vehicle security module may discriminate between authorized and unauthorized signals that are input to the on board diagnostics connector. Authorized signals may be forwarded by the vehicle security module to the one or more CAN busses. The unauthorized signals may be refused entry to the one or more CAN busses.

The on board diagnostics connector may be connected to one or more devices selected from a group comprising diagnostic instrumentation, control instrumentation, and tracking instrumentation.

An OEM of the vehicle security module may create a public and private key pair. The vehicle security module may create a public and private key pair. The OEM may embed the OEM public key into the vehicle security module. A policy change requestor (PRC) may create a public and private key pair. The OEM may uses its private key to digitally sign a certificate containing an identity of the policy change requestor and the public key of the policy change requestor. The OEM may create a policy change authorization token to include changes to a security policy and an identification (ID) of one or more dongles associated with the authorization token. The authorization may be signed with the private key of the OEM. A public key and a private key may be created for the one or more dongles having the ID. The policy change requestor may use its private key to sign a certificate for the one or more dongles having the ID. The policy change requestor may load a copy of the certificate into the one or more dongles.

When a dongle of the one or more dongles is connected to the on board diagnostics connector, the vehicle security module may achieve a confirmation of the ID of the dongle, a confirmation that the authorization token is bound to the dongle, and a confirmation that the authorization token was authorized by the OEM.

A security or safety policy in the vehicle security module may be changed in a field using a cryptographically protected authorization token that is directly or indirectly associated with the dongle.

The vehicle security module may have a security policy. The security policy may specify the messages allowed to flow to or from the vehicle security module to a device connected to the on board diagnostics connector.

The authorization token may specify one or more changes to be applied to the security policy when the one or more dongles associated with the authorization token are connected to the on board diagnostics connector.

A security policy may block or allow one or more messages based upon virtually any characteristic of a message. A change of security policy may change any characteristic of a message used to block or allow the message.

An approach for authorizing a policy change in a vehicle security module, may incorporate plugging a device selected from a group comprising diagnostic instrumentation, control instrumentation, tracking instrumentation, and dongles, into an on board diagnostics connector connected to a vehicle security module that is in turn connected to one or more controller area network (CAN) buses. The one or more CAN buses may be connected to one or more electronic control units (ECUs). The vehicle security module may block unauthorized signals and allow authorized signals to the CAN buses. Allowing authorized signals to the CAN buses may result in a policy change in the vehicle security module.

The vehicle security module may have a policy for determining which signals are authorized and which signals are unauthorized. The one or more ECUs may be connected to components of a vehicle. Authorized signals may affect operation of one or more of the components of the vehicle. Authorized signals may change the policy of the vehicle security module. A manufacturer of the vehicle may be permitted to manage the policy of the vehicle security module.

The manufacturer may set a default version of the policy of the vehicle security module. The manufacturer may selectively authorize policy change requestors to override one or more aspects of the policy of the vehicle security module.

The manufacturer may provide an authorization token that identifies changes that a policy change requestor is permitted to make to a vehicle having the vehicle security module.

A policy select function may be implemented by a switch to select a drive mode or a diagnostics mode for the vehicle security module. A resulting policy of a drive mode with the authorization token may be the drive mode with changes of the policy contained in the authorization token. The resulting policy of a drive mode without the authorization token may be the drive mode absent changes. The resulting policy of a diagnostic mode with the authorization token may be the diagnostic mode with changes of the policy contained in the authorization token. The resulting policy of a diagnostic mode without the authorization token may be the diagnostic mode absent changes.

The authorization token may be implemented in a cryptographic manner.

When the vehicle security module is in the diagnostics mode, the vehicle security module may emit a signal of an audible or visible nature to inform anyone in a vicinity of the vehicle that the policy of the vehicle security module, which is enforced while the vehicle is in the drive mode, is bypassed.

A policy change requestor may perform a cryptographic handshake with the vehicle to ensure that the policy change request is authorized.

A mechanism for providing authorized changes of policy to the vehicle security module, may incorporate a vehicle security module, an on board diagnostics port connected to the vehicle security module, one or more controller area network (CAN) buses connected to the vehicle security module, and one or more electronic control units (ECUs) connected to the one or more CAN buses. The one or more ECUs may be associated with one or more components, respectively, of a vehicle.

An association with the one or more components may incorporate one or more items of a group consisting of functions, settings, control and diagnostics of the one or more components.

The mechanism may further incorporate a dongle plugged into the on board diagnostics port. The dongle may incorporate a loaded authorization token. The authorization token may authorize a change of policy of the vehicle security module.

The authorization token may allow the vehicle security module to confirm one or more items of a group incorporating an identity of the dongle, the authorization token being bound to the dongle, and the authorization token being validated by a manufacturer of the vehicle. The policy in the vehicle security module may be changed in the field by using the authorization token that is cryptographically protected.

Any publication or patent document noted herein is hereby incorporated by reference to the same extent as if each publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A vehicle security system for a vehicle, the system comprising:
   one or more controller area network (CAN) buses;
   one or more electronic control units (ECUs) connected to the one or more CAN buses;
   a vehicle security module (VSM) connected to the one or more CAN buses; and
   an on board diagnostics (OBD) connector connected to the vehicle security module; and
   wherein:
   the vehicle security module discriminates between authorized and unauthorized signals that are input to the on board diagnostics connector; and
   the VSM has a security policy;
   the security policy specifies the types of messages that are allowed to flow to and/or from the vehicle to a device plugged into the OBD connector;
   the VSM is configured to verify a token in the device plugged into the OBD connector and modify the security policy according to a change specified in the verified token to allow the VSM to classify a signal as an authorized signal when the VSM would otherwise classify the signal as an unauthorized signal and facilitate performing a service on the vehicle that would not otherwise be permitted by the security policy;

authorized signals are forwarded by the vehicle security module to the one or more CAN busses; and the unauthorized signals are refused entry to the one or more CAN busses.

2. The system of claim 1, wherein the device to which the on board diagnostics connector is configured to receive is one or more devices selected from a group comprising diagnostic instrumentation, control instrumentation, and tracking instrumentation.

3. The system of claim 1, wherein:

an original equipment manufacturer (OEM) of the vehicle security module creates a public and private key pair;

the vehicle security module creates a public and private key pair;

the OEM embeds the OEM public key into the vehicle security module;

a policy change requestor (PRC) creates a public and private key pair;

the OEM uses its private key to digitally sign a certificate containing an identity of the policy change requestor and the public key of the policy change requestor;

the OEM creates a policy change authorization token to include changes to a security policy and an identification (ID) of one or more dongles associated with the authorization token;

the authorization is signed with the private key of the OEM; and a public key and a private key are created for the one or more dongles having the ID;

the policy change requestor uses its private key to sign a certificate for the one or more dongles having the ID; and the policy change requestor loads a copy of the certificate into the one or more dongles.

4. The system of claim 3, wherein when a dongle of the one or more dongles is plugged into to the on board diagnostics connector, the vehicle security module can achieve a confirmation of the ID of the dongle, a confirmation that the authorization token is bound to the dongle, and a confirmation that the authorization token was authorized by the OEM.

5. The system of claim 4, wherein the security policy in the vehicle security module can be changed in a field using a cryptographically protected authorization token that is directly or indirectly associated with the dongle.

6. The system of claim 3, wherein the authorization token specifies one or more changes to be applied to the security policy when the one or more dongles associated with the authorization token are plugged into to the on board diagnostics connector.

7. The system of claim 6, wherein:

the security policy can block or allow one or more messages based upon virtually any characteristic of a message; and a change of security policy can change any characteristic of a message used to block or allow the message.

8. A method for authorizing a policy change in a vehicle security module, comprising:

plugging a device selected from a group comprising diagnostic instrumentation, control instrumentation, tracking instrumentation, and dongles, into an on board diagnostics connector connected to a vehicle security module that is in turn connected to one or more controller area network (CAN) buses, the vehicle security module having a default security policy that specifies the types of messages that are allowed to flow to and/or from the vehicle to the device plugged into the onboard diagnostics connector;

verifying an authentication token in the device plugged into the on board diagnostics connector;

modifying the default security policy of the vehicle security module according to a change specified in the verified authentication token; and classifying a signal as authorized under the modified security policy that would otherwise be classified as unauthorized under the default security policy to facilitate performing a service on the vehicle that would not otherwise be permitted by the default security policy; and wherein:

the one or more CAN buses are connected to one or more electronic control units (ECUs);

the vehicle security module blocks unauthorized signals and allows authorized signals to the CAN buses.

9. The method of claim 8, wherein:

the one or more ECUs are connected to components of a vehicle;

authorized signals can affect operation of one or more of the components of the vehicle;

authorized signals can change the policy of the vehicle security module; and a manufacturer of the vehicle is permitted to manage the policy of the vehicle security module.

10. The method of claim 9, wherein:

the manufacturer sets a default version of the policy of the vehicle security module; and the manufacturer can selectively authorize policy change requestors to override one or more aspects of the policy of the vehicle security module.

11. The method of claim 9, wherein the manufacturer provides the authorization token that identifies changes that a policy change requestor is permitted to make to a vehicle having the vehicle security module.

12. The method of claim 11, wherein:

a policy select function is implemented by a switch to select a drive mode or a diagnostics mode for the vehicle security module;

a resulting policy of a drive mode with the authorization token is the drive mode with changes of the policy contained in the authorization token;

the resulting policy of a drive mode without the authorization token is the drive mode absent changes;

the resulting policy of a diagnostic mode with the authorization token is the diagnostic mode with changes of the policy contained in the authorization token; and the resulting policy of a diagnostic mode without the authorization token is the diagnostic mode absent changes.

13. The method of claim 12, wherein the authorization token is implemented in a cryptographic manner.

14. The method of claim 12, wherein when the vehicle security module is in the diagnostics mode, the vehicle security module emits a signal of an audible or visible nature to inform anyone in a vicinity of the vehicle that the policy of the vehicle security module, which is enforced while the vehicle is in the drive mode, is bypassed.

15. The method of claim 10, wherein a policy change requestor performs a cryptographic handshake with the vehicle to ensure that the policy change request is authorized.

16. A mechanism for providing authorized changes of policy to the vehicle security module, comprising:
a vehicle security module having a security policy;
an on board diagnostics port connected to the vehicle security module;
one or more controller area network (CAN) buses connected to the vehicle security module; and
one or more electronic control units (ECUs) connected to the one or more CAN buses; and
wherein:
the one or more ECUs are associated with one or more components, respectively, of a vehicle;
the security policy specifies the types of messages that are allowed to flow to and/or from a vehicle to a device plugged into the on board diagnostics port;
the vehicle security module verifies an authorization token in the device plugged into the on board diagnostics port and modifies the security policy according to a change specified in the verified authorization token to allow the vehicle security module to classify a signal as an authorized signal when the vehicle security module would otherwise classify the signal as an unauthorized signal and facilitate performing a service on the vehicle that would not otherwise be permitted by the security policy;
the vehicle security module is configured to forward authorized signals to the one or more CAN buses and refuse entry to the one or more CAN buses to the unauthorized signals.

17. The mechanism of claim 16, wherein an association with the one or more components comprises one or more items of a group consisting of functions, settings, control and diagnostics of the one or more components.

18. The mechanism of claim 17, further comprising:
a dongle plugged into the on board diagnostics port; and
wherein:
the dongle comprises a loaded authorization token; and
the authorization token authorizes a change of policy of the vehicle security module.

19. The mechanism of claim 18, wherein:
the authorization token allows the vehicle security module to confirm one or more items of a group comprising an identity of the dongle, the authorization token being bound to the dongle, and the authorization token being validated by a manufacturer of the vehicle; and
the policy in the vehicle security module can be changed in the field by using the authorization token that is cryptographically protected.

* * * * *